United States Patent [19]

Numako et al.

[11] Patent Number: 4,962,399

[45] Date of Patent: Oct. 9, 1990

[54] ZOOM LENS DRIVING APPARATUS

[75] Inventors: Norio Numako; Takeo Kobayashi, both of Tokyo, Japan

[73] Assignee: Asahi Kogaku Kogyo Kabushiki Kaisha, Tokyo, Japan

[21] Appl. No.: 455,791

[22] Filed: Dec. 20, 1989

Related U.S. Application Data

[63] Continuation of Ser. No. 301,594, Jan. 26, 1989, abandoned.

[30] Foreign Application Priority Data

Feb. 3, 1988 [JP] Japan .................................. 63-23547

[51] Int. Cl.$^5$ .............................................. G03B 3/10
[52] U.S. Cl. .................................................. 354/195.1
[58] Field of Search ..................................... 354/195.1

[56] References Cited

U.S. PATENT DOCUMENTS 4,410,253 10/1983 Tsuboi ............................. 354/195.1

4,445,757 5/1984 Enomoto et al. .......... 354/195.12 X

FOREIGN PATENT DOCUMENTS 60-225122 11/1985 Japan .
60-235125 11/1985 Japan .
64-25112 1/1989 Japan .
WO87/07036 11/1987 PCT Int'l Appl. .
WO87/07038 11/1987 PCT Int'l Appl. .

*Primary Examiner*—Michael L. Gellner
*Attorney, Agent, or Firm*—Sandler, Greenblum & Bernstein

[57] ABSTRACT

A camera having a zoom lens and a mode selection switch, including a first drive for moving the zoom lens in an optical axis direction within a zooming range, and a second drive for selectively moving the zoom lens within and out of a zooming range in accordance with a selection mode selected by a mode selection switch, a zoom lens driving apparatus including a device for varying the speed of the movement of the zoom lens by the first drive and by the second drive.

32 Claims, 16 Drawing Sheets

ZOOM LENS DRIVING APPARATUS

This application is a continuation of application Ser. No. 301,594, filed Jan. 26, 1989, now abandoned.

BACKGROUND OF THE INVENTION

1. Field of the Invention

The present invention relates to a zoom lens driving apparatus in which the speed of travel of a lens during the zooming operation and the speed of travel of the lens into, for example, a macro position or a lens receiving position.

2. Description of Related Art

Recently, zoom lenses having various macro functions have been developed. For example, in a zoom lens having a powered zoom lens, it is known to electrically switch a zooming area and a macro mode. The assignee of the present application has developed and proposed the kind of camera having a powered zoom lens, for example, in U.S. Ser. No. 144,030, U.S. Ser. No. 244,789 and PCT/JP87/00292. Generally speaking, in this kind of zoom lens, the zooming speed is set to be optimum in accordance with a design, but the speed of the movement of a lens barrel to minimize the length thereof in order to receive the lens into a lens receiving position and the speed of switching the mode into a macro mode and vice versa should be as quick as possible.

However, in the prior art, since the operations mentioned above are all effected at the same speed (i.e., constant speed) in accordance with the zooming operation, the switching operation into a macro mode and the lens receiving (accomodating) operation are slow and accordingly inconvenient.

SUMMARY OF THE INVENTION

The primary object of the present invention is to provide a zoom lens driving apparatus of a powered zoom lens having a macro function, in which the speed of travel of the lens at the zooming operation is slower than that at the switching operation into the macro mode to move the lens beyond a zooming area and at the lens receiving operation.

To achieve the object mentioned above, a camera is provided having a first driving means for driving the zoom lens in the optical axis direction within a zooming area and a second driving means for driving the zoom lens between the zooming area and the out-of zooming area in accordance with a selection mode, according to the present invention, a constant speed means is provided to keep constant only the driving speed of the zoom lens by the first driving means.

With this arrangement, the zooming operation can be effected at an optimum speed and the transfer into the macro mode and vice versa can be effected at an increased speed, thus resulting in an effective operations.

BRIEF DESCRIPTION OF THE DRAWINGS

The invention will be now described below in detail with reference to the accompanying drawings in which.

DETAILED DESCRIPTION OF PREFERRED EMBODIMENTS

The following discussion will be directed to the illustrated embodiments of the present invention.

Figure 1:
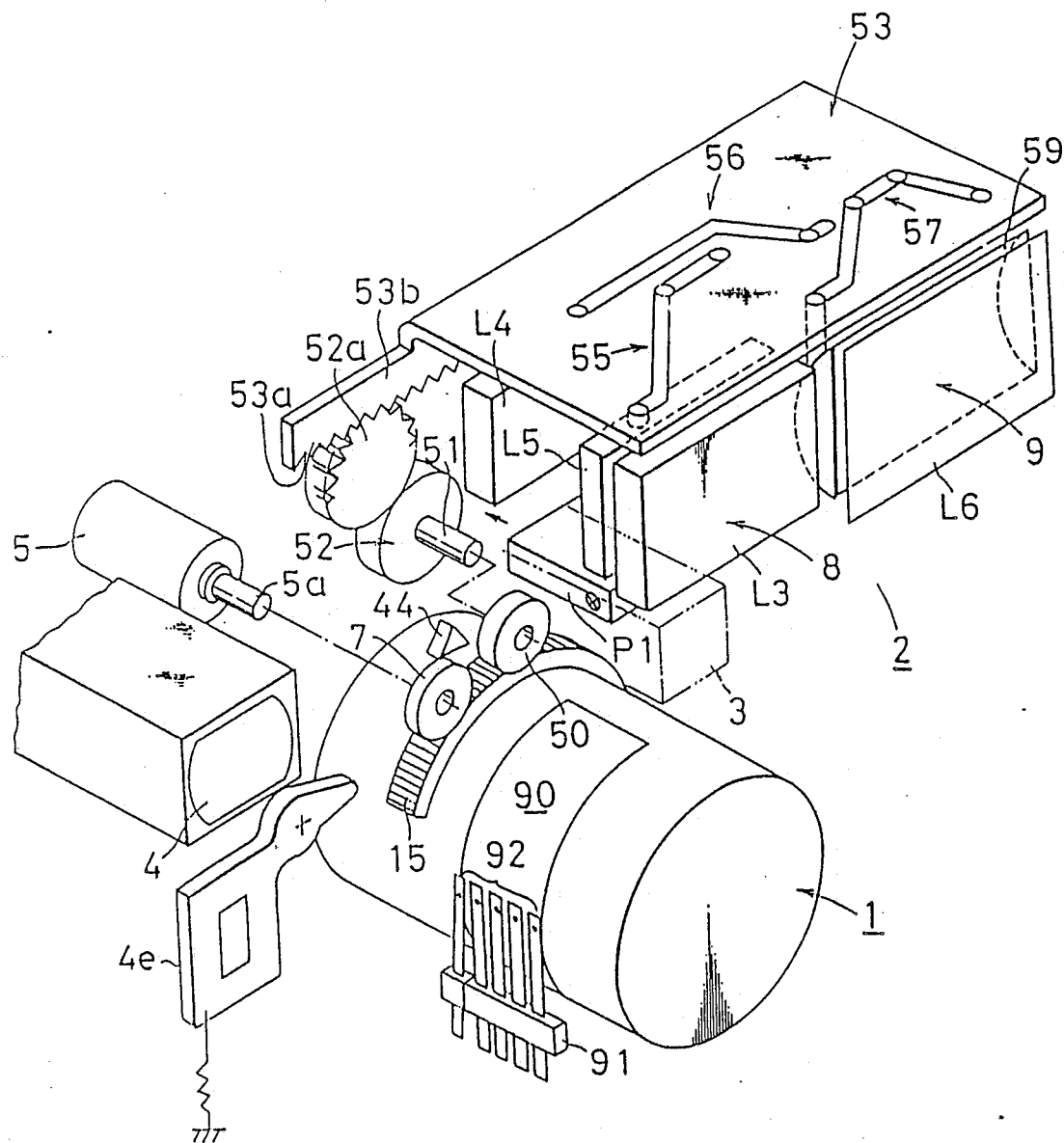
FIG. 1 is a schematic perspective view of the main elements of a lens shutter type camera according to one aspect of the present invention.
Figure 2:
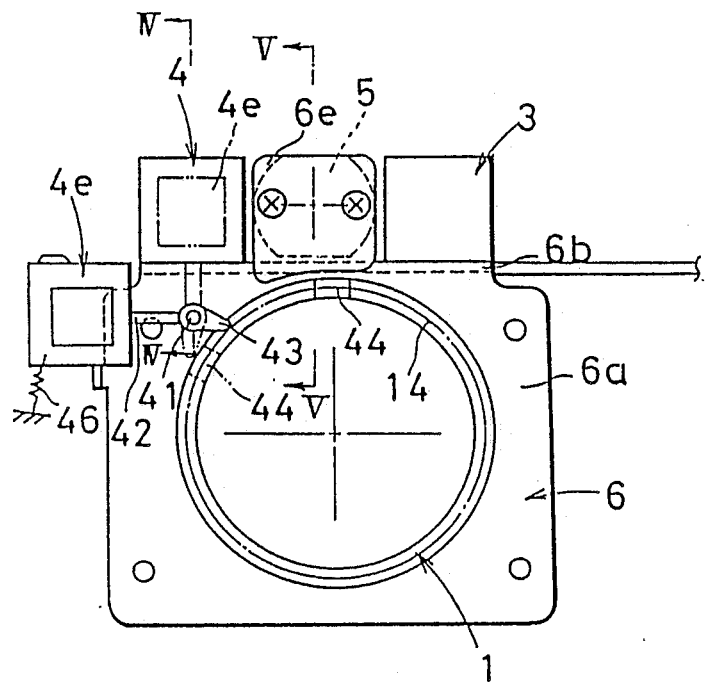
FIG. 2 is a front elevational view of a lens barrel block, light emitting portion and light receiving portion of an object distance measuring device, a close distance correcting optical element and a zoom motor of the camera of FIG. 1.
Figure 3:
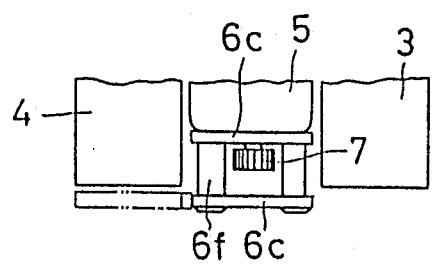
FIG. 3 is a plan view of FIG. 2.
Figure 4:
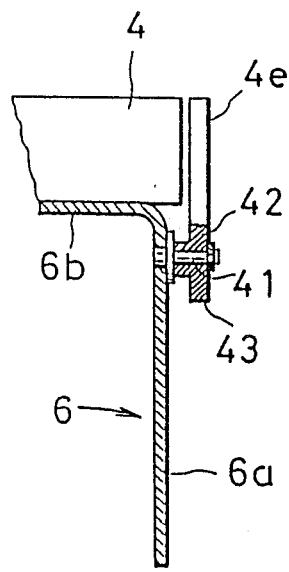
FIGS. 4 and 5 are sectional views taken along the lines IV—IV and V—V in FIG. 2, respectively.
Figure 5:
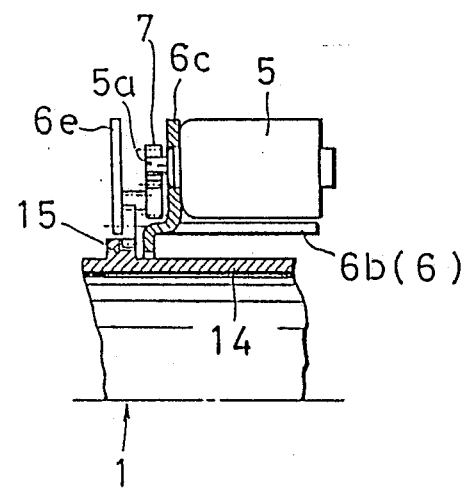

A lens shutter type camera to which the present invention is applied has a lens barrel block 1, a finder strobe block 2 which will be referred to as a finder block, of a zoom lens, a light emitter 3, a light receiver 4 of an object distance measuring device (AF device), and a zoom motor 5, as generally shown in FIG. 1. These components are secured to a base plate 6 (FIGS. 2 and 5) which is an immovable part of a camera. Namely, the base plate 6 has a lens barrel supporting plate portion 6a normal to the optical axis, a horizontal supporting plate portion 6b which is bent at a right angle with respect to the lens barrel supporting plate portion 6a at an upper end of the latter and a motor supporting plate portion 6c perpendicular to the horizontal supporting plate portion 6b. The lens barrel block 1 is supported by the lens barrel supporting plate portion 6a.

The zoom motor 5, which is placed above the center of the lens barrel block 1, is secured to the motor supporting plate portion 6c. The light emitter 3 and the light receiver 4, which are secured to the horizontal supporting plate portion 6b, are located on the opposite sides of the zoom motor 5.

The finder block 2 is secured to the front right portion of the horizontal supporting plate portion 6b. A gear train supporting plate 6c is secured to the motor supporting plate portion 6c through a spacer 6f.

Figure 6:
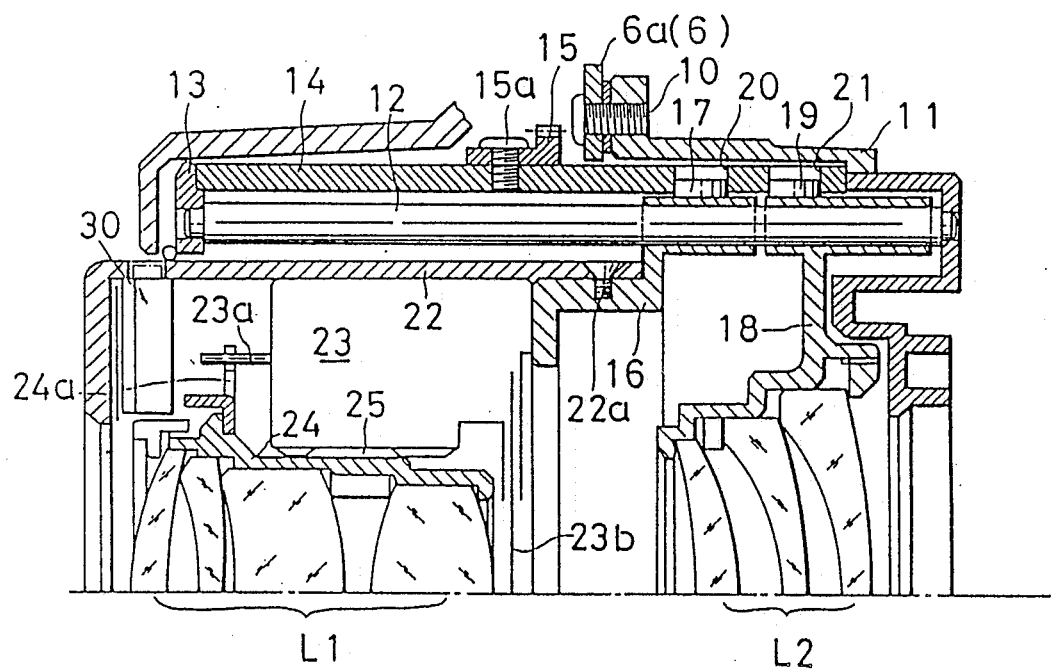
FIG. 6 is a longitudinal sectional view of a lens barrel block.

A variable power lens group (front lens group $L_1$ and rear lens group $L_2$) for zooming of the lens barrel block 1 is driven by the zoom motor 5. The construction of the lens barrel block 1 will be described below with reference to FIGS. 6 to 8.

To the lens supporting plate portion 6a of the base plate 6 is secured a rear securing plate 11 by set screws 10 which has four guide rods 12 secured thereto which extend parallel to the optical axis to surround the same. The front securing plate 13 is secured to the front ends of the guide rods 12. The components mentioned above are main stationary elements of the lens barrel block 1.

Between the rear securing plate 11 and the front securing plate 13 is rotatably supported a cam ring 14 which is provided on its outer periphery with a gear 15 secured thereto by set screws 15a. The gear 15 is in mesh with a pinion 7 directly or through a gear train (not shown). The gear 15 can be a sector gear which covers the rotational displacement of the cam ring 14. The cam ring 14 has a zooming cam groove 20 for the front lens group and a zooming cam groove 21 for the rear lens group.

Figure 7:
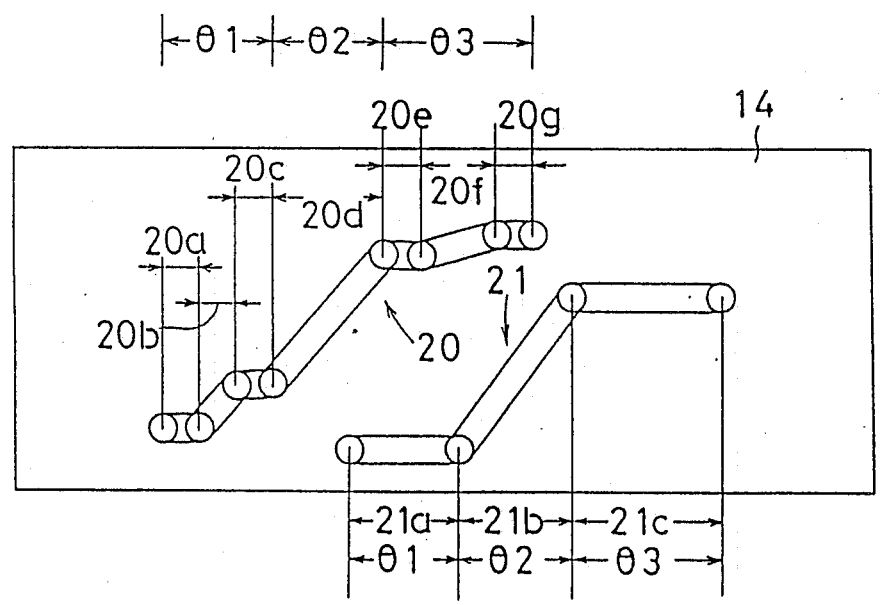
FIG. 7 is a developed view of cam grooves of a cam ring for front and rear lens groups.
Figure 8:
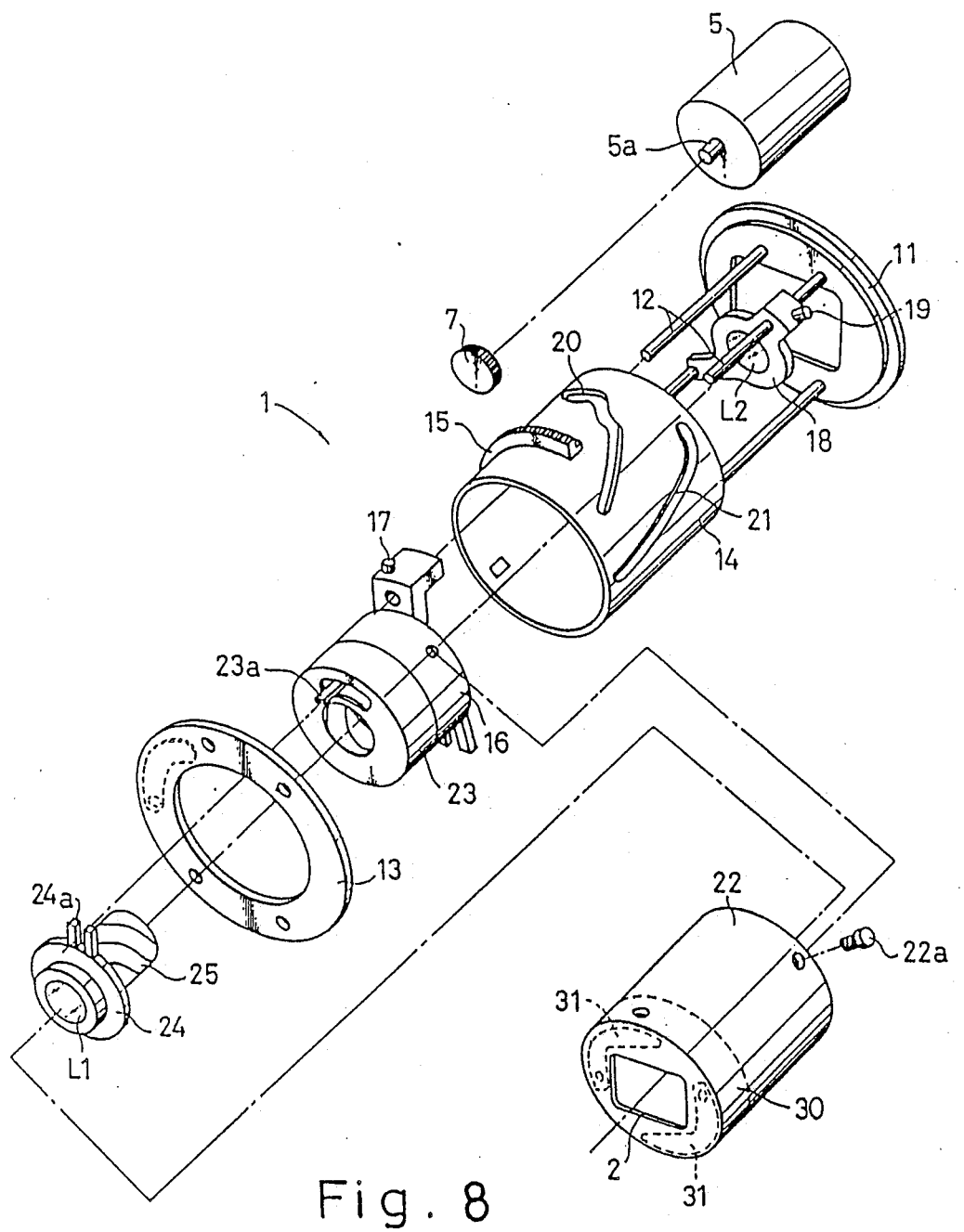
FIG. 8 is an exploded perspective view of a lens barrel block.

FIG. 7 shows a developed view of the zooming cam grooves 20 and 21. The zooming cam groove 21 for the rear lens group has a wide angle extremity fixing section 21a, a variable power section (magnification varying section) 21b and a telephoto extremity fixing section 21c. The zooming cam groove 20 for the front lens group has an opening and closing section 20a of the barrier block 30, a lens receiving section 20b, a wide angle extremity fixing section 20c, a variable power section 20d, a telephoto extremity fixing section 20e, a macro feeding section 20f and a macro extremity fixing section 20g.

The total angle $\theta 1$ of the rotational displacement of the opening and closing section 20a, the lens retracting section (lens receiving section) 20b, and the wide angle extremity fixing section 20c, of the zooming cam groove 20 is identical to the angle $\theta 1$ of the wide angle extremity fixing section 21a of the zooming cam groove 21. The angle $\theta 2$ of the variable power section 20d is identical to the angle $\theta 2$ of the variable magnification (variable power) section 21b. Further, the total angle $\theta 3$ of the telephoto extremity fixing section 20e, the macro extremity fixing section 20g, and the macro feeding section 20f is equal to the angle $\theta 3$ of the telephoto extremity fixing section 21c. In the illustrated embodiment, the zooming range is 35 mm ~70 mm.

In the zooming cam grooves 20 and 21 are fitted a roller 17 of a front group frame 16 and a roller 19 of a rear group frame 18, respectively. The front group frame 16 and the rear group frame 18 are movably guided by the guide rods 12. A lens frame 22 and a shutter block 23 are secured to the front group frame 16 by means of set screws 22a.

A front lens frame 24, which supports the front lens group L1, is engaged to the shutter block 23 by means of a helicoid 25. The front lens frame 24 has an arm 24a which comes into engagement with a lens feeding lever 23a of the shutter block 23, so that when the lens feeding lever 23a rotates in the circumferential direction to rotate the front lens frame 24, the front lens frame 24 moves in the optical axis direction with the help of the helicoid 25. The rear lens group L2 is directly secured to the rear group frame 18.

The shutter block 23 rotates the lens feeding lever 23a by a predetermined angular displacement, in accordance with a detection signal from the distance measuring device by means of a pulse motor incoporated in the camera body to open shutter (sector) 23b which has been closed for a predetermined time, and then return the lens feeding lever 23a to its initial position after the shutter is closed again. This kind of shutter block 23 is well known, as disclosed in for example Japanese Unexamined Patent Publication (Kokai) Nos. 60-225122 and 60-235125. The present invention basically utilizes such a shutter block without a modification.

The finder block 2 will be discussed below with reference to FIG. 1. The finder block 2 includes a finder device 8 and a strobe device 9. Both the finder device 8 and the strobe device 9 move in association with the change of the focal length of the lens barrel block 1 to vary the finder field of view and the illumination angle (light intensity) of the strobe, respectively. The drive source of the finder and strobe operations is the zoom motor 5.

The gear 15 of the cam ring 14 is engaged by a pinion 50 that is different from the pinion 7. A shaft 51 of the pinion 50 extends toward the rear portion of the base 6 and is provided, on its rear end, with a reduction gear train 52. The reduction gear train 52 has a terminal gear 52a which is in mesh with a rack 53a of a cam plate 52. The cam plate 53 is slidable in the right and left hand directions (lateral directions) and has a downward bent portion 53b at its rear end. The rack 53a is formed on the lower end of the bent portion 53b of the cam plate 53. The reduction gear train 52 is adapted to reduce the rotation of the gear 15 in order to restrict the movement of the cam plate 53.

The cam plate 53 is provided with variable power cam groove 55 for the finder device 8, a parallax correcting cam groove 56, and a strobe cam groove 57 of the strobe device 9.

The lens system of the finder device 8 is essentially composed of a subject lens group L3, and eye-piece lens group L4, and a movable variable power lens group L5, and also includes a deflection prism P1 for a macro mode.

The variable power lens group L5 makes the image picture size which varies in accordance with the variable power operation of the lens barrel block 1 coincident with the field of view by the finder device 8. The deflection prism P1 comes in the light path of the lens system only in the macro mode particularly to adjust the parallax. Namely, the parallax which is inevitable in the lens shutter type of camera becomes large as an object to be photographed comes closer, and accordingly, a large parallax can be caused in the macro mode. To solve this problem of a large parallax in the macro mode, the deflection prism P1 is provided in the present invention, which is in the form of a wedge with a thick lower end and a thinner upper end. The deflection prism P1, when located in the light path, deflects the rays of light downward to take a picture of the object closer to the camera.

The strobe device 9 restricts the illumination angle as the focal length of the photographing lens is large, namely as the lens is fed forward and increases the illumination angle at the macro mode to decrease the quantity of light incident upon the object. In the illustrated embodiment, the strobe device 9 has a fixed Fresnel lens L6 and a movable concave reflector (reflecting shade) 59 with a xenon lamp 58 which can be moved in the optical axis direction.

The following discussion will be addressed to the control system of the lens shutter type of camera to which the present invention is applied.

In this camera, information, such as the change of focal length of the zoom lens of the lens barrel block 1, the change of open F number in accordance with the change of focal length, the location of the lens at the wide angle extremity (WIDE), the location of the lens at the telephoto extremity (TELE), the location of the lens in the receiving position, and the macro photographing mode etc. are automatically detected to perform the necessary controls. To detect the lens position, a code plate 90 is attached onto the outer periphery of the cam ring 14 of the lens barrel block 1, as schematically shown in FIG. 1. An immovable frame 91 provided outside the cam ring 14 has brushes 92 which are connected to the immovable frame 91 at the base ends thereof and which are brought into slide-contact with the code plate 90.

Figure 9:
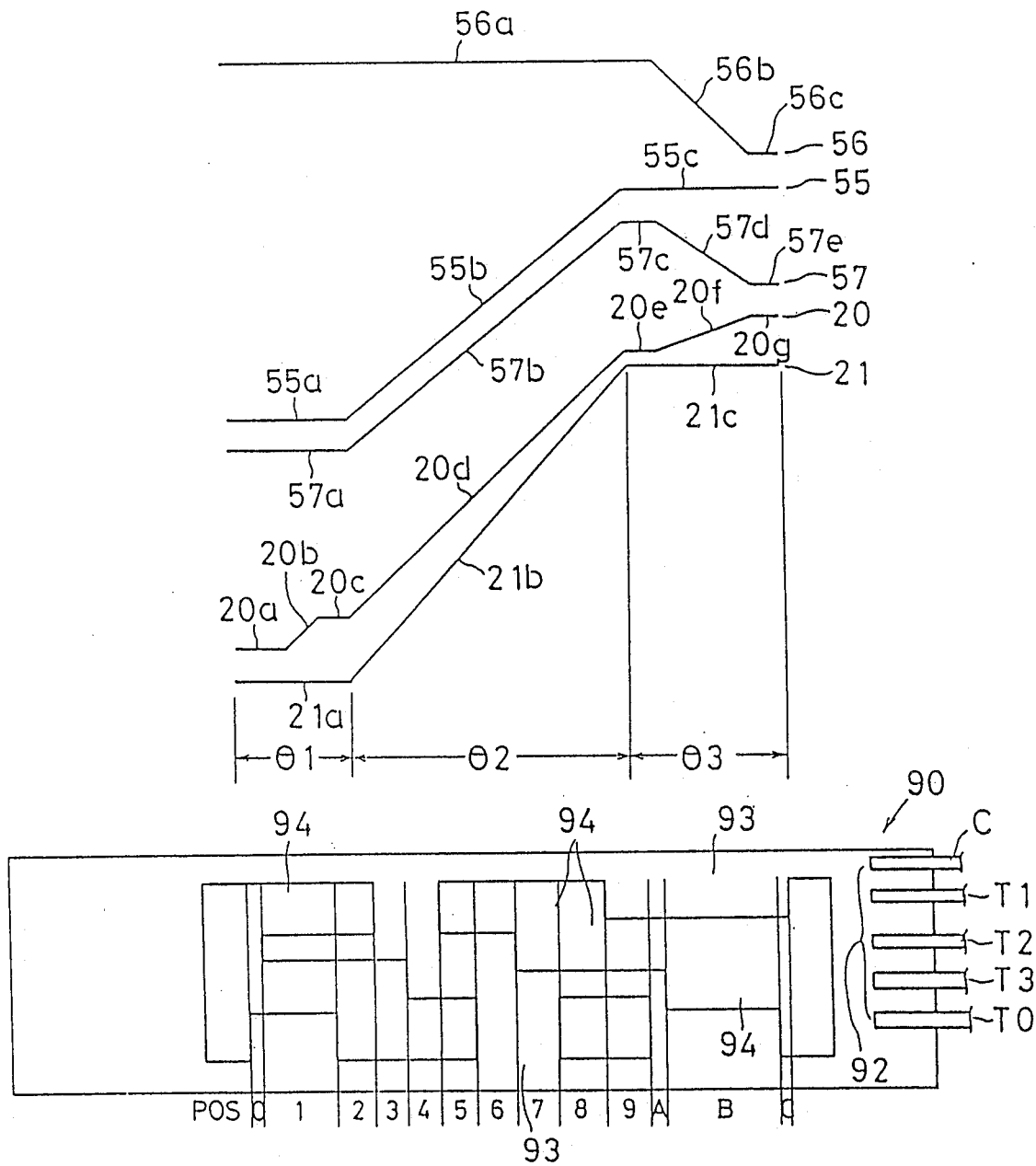
FIG. 9 is a diagram showing a code plate, zoom codes by the code plate and stop positions thereof.

FIG. 9 shows a developed view of the code plate 90, in which the cam profiles of the zooming cam grooves 20 and 21 and the cam grooves 55, 56 and 57 of the cam plate 53 are illustrated in the upper part of the drawing. The brushes 92 have a common terminal C and four contact terminals T0, T1, T2 and T3 which are labeled 0, 1, 2 and 3. When the terminals T0~T3 come into contact with conductive lands 93 of the code plate 90, the signal "0" is output, and when the terminals T0~T3 do not come into contact with the conductive lands 93, the signal "1" is output. The angular position of the cam ring 14 can be detected by the combination of the signals "0" and "1". Numeral 94 designates a dummy terminal provided between the conductive lands 93.

Figure 10:
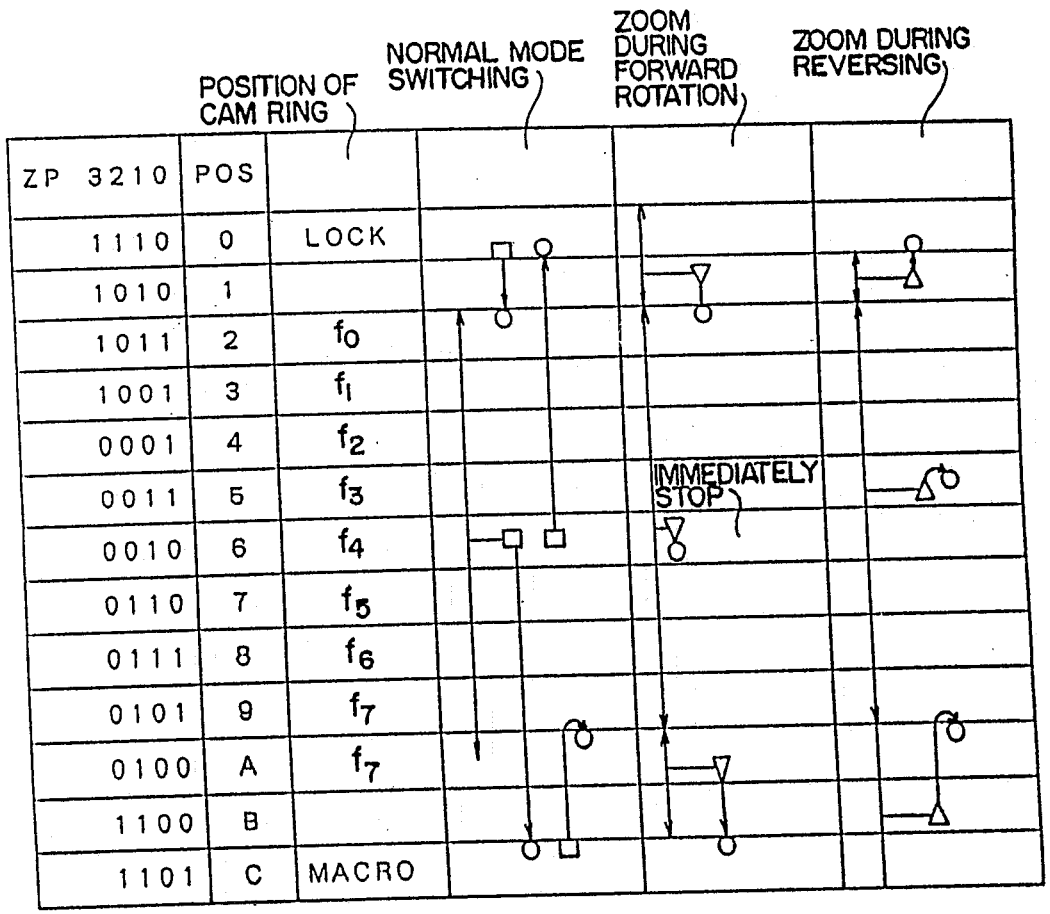
FIG. 10 is a diagram showing zoom codes by the code plate shown in FIG. 9 and stop positions thereof.

Four bit information of T0, T1, T2 and T3 are supplied as zoom code data ZP0, ZP1, ZP2 and ZP3 of a zoom code encoder. FIG. 10 shows a combination of "0" and "1" of the zoom code data, by way of an example. In this example, 13 angular positions (POS) of the cam ring 14 are detected in the hexadecimal number, "0"~"9", "A", "B" and "C". Note that "0" designates the lock position (LOCK) and "C" the macro position (MACRO), and there are nine focal lengths f0~f7 and f7' between LOCK and MACRO. These angular positions (POS) are illustrated also in FIG. 9 below the code plate 9.

Figure 11:
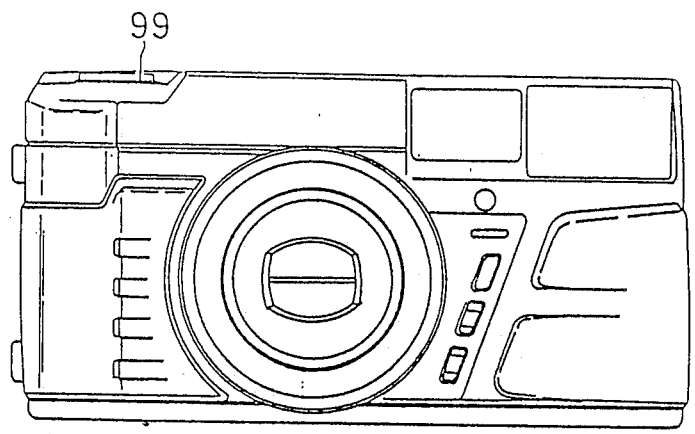
FIG. 11, 12 and 13 are a front elevational view, rear elevational view and plan view, respectively, of a camera to which the present invention is applied to show an arrangement of various operation switches.
Figure 12:
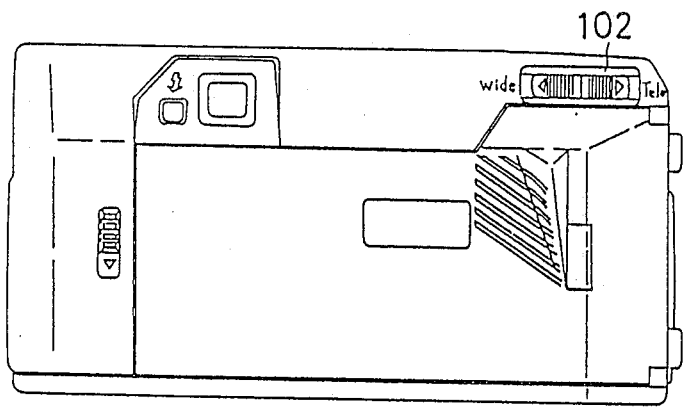
Figure 13:
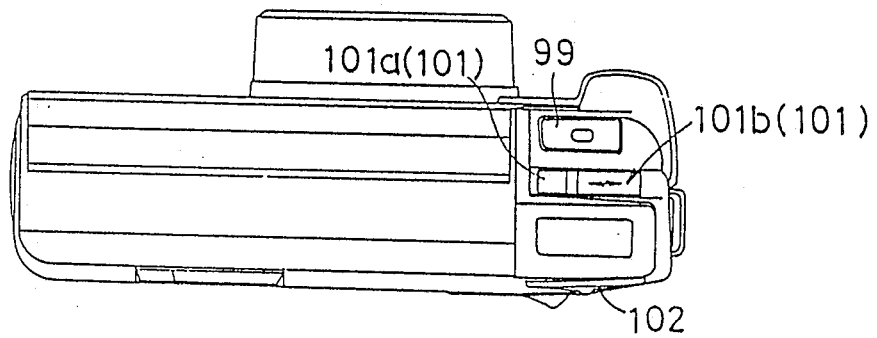

The control of the rotation of the cam ring 14 is carried out by a mode selection switch 101 and a zoom switch 102. FIGS. 11 to 13 show one example of an arrangement of the switches 101 and 102 provided on the camera body. Numeral 99 in FIGS. 11 and 13 designates a release button which turns a photometer (light detecting device) switch 103 (FIG. 14) ON when pushed by a half step and which turns a release switch 123 (FIG. 14) ON when pushed by one step (further half step).

The mode selection switch 101 is a transfer type of switch which can occupy three positions; LOCK, ZOOM and MACRO. When the mode selection switch 101 is in the LOCK position, neither releasing nor zooming can be effected. At the ZOOM position, both the releasing and zooming can be effected. At the macro position, releasing can be effected but no zooming is possible.

When an external force (i.e. photographer's finger) is released from the zoom switch 102, the latter occupies a neutral (OFF) position. The zoom switch 102 can be selectively and manually brought into WIDE and TELE in the opposite directions. When the zoom switch 102 is switched WIDE and TELE, the zoom motor 5 can be selectively rotated in the forward and reverse directions.

Basically, the mode selection switch 101 and the zoom switch 102 actuates the camera to which the present invention is applied as follows.

① When the mode selection switch 101 is in the LOCK position:

The zoom motor 5 begins reversing at a high speed and stops when the angular position of the cam ring 14, which will be referred to as POS, and which is detected by the code plate 90 and the brushes 92 in combination is "0" (FIGS. 9 and 10, the same below).

② When the mode selection switch 101 is in the MACRO position:

The zoom motor 5 begins rotating in the forward direction at a high speed and stops when POS is "C".

③ When the mode selection switch 101 is in the ZOOM position:

When the zoom switch 102 is turned ON to occupy WIDE, the zoom motor 5 begins reversing at a low speed. The reversing at a low speed is maintained during the ON state of the zoom switch 102. When the zoom switch 102 is turned ON to occupy TELE, the zoom motor 5 rotates in the forward direction at a low speed. In this state, when POS is "A", the zoom motor 5 stops rotating. When WIDE is ON, the zoom motor 5 continues reversing for a certain short period of time after POS becomes "1". After that, the zoom motor 5 rotates in the forward direction until POS becomes "2" at which the zoom motor 5 stops rotating.

If the zoom switch 102 is turned OFF (neutral position) during the low speed rotation of the zoom motor 5 in the forward direction, the zoom motor 5 immediately stops rotating. If the zoom switch 102 is turned OFF (neutral position) during the low speed rotation of the zoom motor 5 in the reverse direction, the zoom motor 5 stops rotating after it rotates in the forward direction for a certain short period of time. The forward rotation for a certain short period of time contributes to the elimination of a possible backlash of the mechanism of the lens barrel block 1 and the finder block 2 and also to the absorption of a possible deviation in stop position between when the zoom motor is stopped during the occupation of WIDE and when the zoom motor is stopped during the occupation of TELE.

The whole control system of a camera including the above mentioned control will be described below in more detail.

Figure 14:
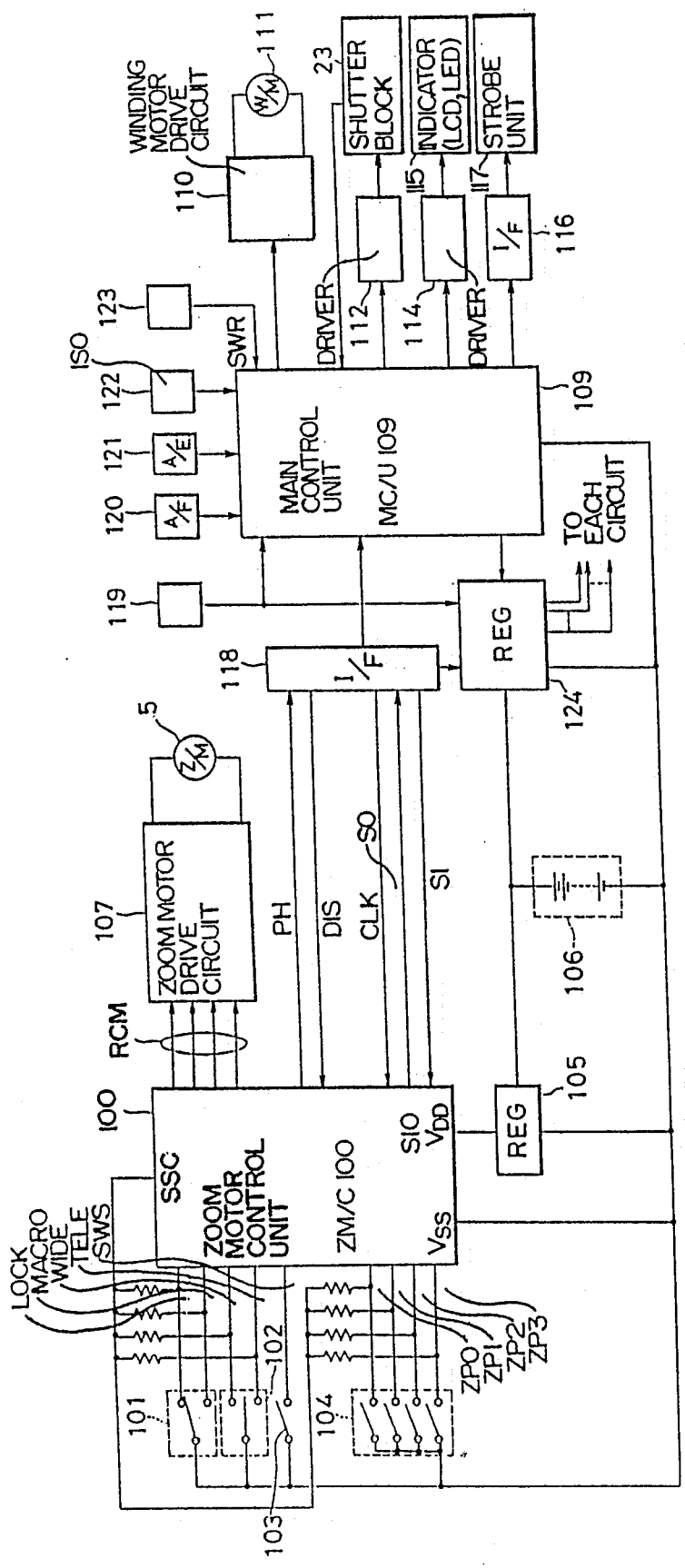
FIG. 14 is a block diagram showing a control circuit of a camera according to the present invention.

In FIG. 14, a zoom motor control unit 100, referred to as ZM/C, comprises a single chip micro computer in which a program (which will be described below) is stored in an internal program memory (ROM). When ZM/C 100 performs the program, the first and second driving means and stopping means according to the present invention can be operated.

Switch data from the mode selection switch 101, the zoom switch 102, the photometer switch 103 and a zoom encoder 104 which is represented by a switch equivalent circuit in FIG. 14. In addition, a zoom motor operation prohibiting singal DIS, a clock signal CLK for transferring serial data, and serial signal SI (which carries switch check/operation completion data) are inputted to ZM/C 100 from the main control unit (which will be referred to as MC/U), as will become clearer hereinafter.

ZM/C 100 outputs a rotation control command RCM into a zoom motor drive circuit 107 which controls the zoom motor 5 and a power hold signal PH, which turns the power source ON and OFF and a serial signal SO which carries the zoom code data ZP0~ZP3 from the zoom encoder 104 into MC/U 109.

The mode selection switch 101 generates two signals, LOCK and MACRO, shown in the following table 1 in accordance with the above mentioned three positions; LOCK, ZOOM and MACRO.

TABLE 1

| POSITION | NAME OF SIGNALS | |
|---|---|---|
|  | LOCK | MACRO |
| LOCK | L(ON) | H(OFF) |

TABLE 1-continued

| POSITION | NAME OF SIGNALS | |
|---|---|---|
| | LOCK | MACRO |
| ZOOM | H | H |
| MACRO | H | L |

The zoom switch 102 can occupy three positions WIDE momentary, OFF, and TELE momentary, as mentioned before.

The photometer switch 103 is actuated (operation signal SWS) by pushing the release button 99 half-way to operate the object distance measuring device 120 (which has the light emitter 3 and the light receiver 4) and the photometer (A/E) 121.

The zoom encoder 104 detects the angular position of the cam ring 14 as the zoom code ZP0~ZO3 by the code plate 90 and the brushes 92 in combination and sends the detected signals to ZM/C 100.

In the switch scan control process which is done through terminal SSC, a high voltage "H" is supplied only when the input of the switches mentioned above is checked and a low voltage "L" is supplied at the time other than above-mentioned checking reduce the power consumption.

A regulator 105 which is activated by a battery 106 energizes the ZM/C 100 with a desired driving voltage.

Figure 15:
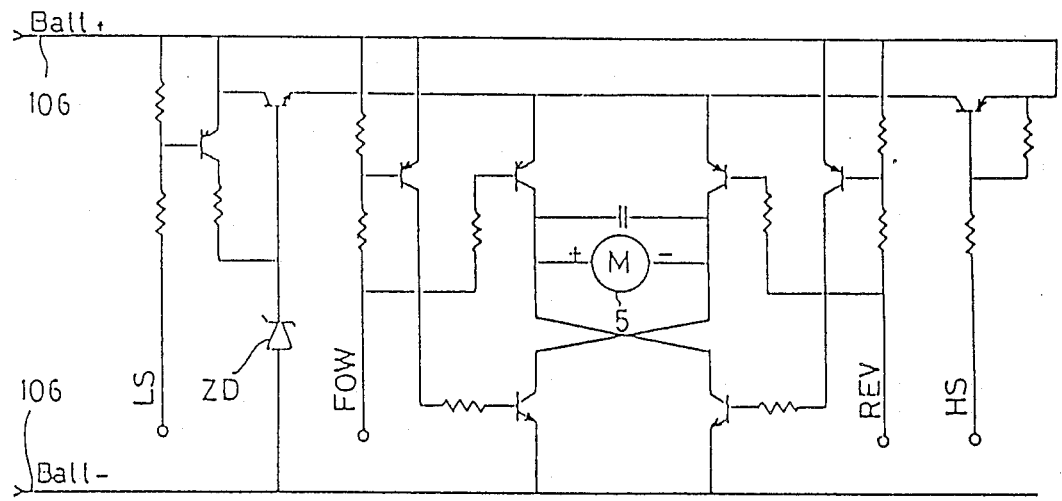
FIG. 15 is a diagram showing a driving circuit of a zoom motor.

A zoom motor drive circuit 107, which comprises an electrical circuit shown in FIG. 15, turns ON and OFF terminals HS, LS, FOW and REV in accordance with 4 bit rotation control command RCM (HS, LS, FOW and REV) from ZM/C 100, as shown in the tables 2 and 3 to control the rotation and stoppage of the zoom motor 5. In this circuit, it is possible to rotate the zoom motor 5 in both the forward direction and the reverse direction at two different speeds, i.e. high and low speeds.

The high speed rotation is determined by the electrical power of the battery 106 and the low speed rotation is controlled by a Zener diode ZD in the zoom motor drive circuit 107.

TABLE 2

(Motor Rotation Control)

| | HS | LS | FOW | REV |
|---|---|---|---|---|
| FORWARD ROTATION AT HIGH SPEED | ON | | ON | |
| REVERSE ROTATION AT HIGH SPEED | ON | | | ON |
| FORWARD ROTATION AT LOW SPEED | | ON | ON | |
| REVERSE ROTATION AT LOW SPEED | | ON | | ON |

Note: Blank is OFF.

TABLE 3

(Brake Sequence)

| | HS | LS | FOW | REV |
|---|---|---|---|---|
| 1 MOTOR ROTATION | According to Table 2 | | | |
| 2 OPEN | | | | |
| 3 BRAKE | | | ON | ON |
| 4 OPEN | | | | |

Note: Blank is OFF.

MC/U 109, which also comprises, e.g., a single chip microcomputer, performs the program stored in the internal program memory (ROM) to carry out the following functions.
(1) Function of controlling the rotation of winding motor 111 through winding drive circuit 110:
(2) Function of controlling and driving the shutter block 23 through a driver 112:
(3) Function of controlling various indicators 115 through a driver 114;
(4) Function of controlling strobe unit 117 (having a strobe circuit including a xenon light emitting tube 58) through an interface 116:
(5) Function of outputting the zoom motor operation prohibiting signal DIS through an interface 118:
(6) Function of outputting the clock signal CLK for serial transferring through the interface 118:
(7) Function of outputting the serial signal SI carrying the switch check/operation completion data through the interface 118: and,
(8) Function of continuing the operation of the regulator 124.

Switch data from the winding motor control switch 119, such as a film rewinding switch or a rear cover switch or the like, photometer data from the photometer 121, distance detection data from the object distance measuring device 120, film sensitivity data from a film sensitivity setting device or DX automatic reader (ISO) 122, and switch data SWR from the release switch 123 are inputted to MC/U 109.

The operation of the regulator 124 is continued by MC/U 109. The operation (start/stop) of the regulator 124 is controlled by the presence of the power hold signal PH which is input thereto through the interface 118. The regulator 124 can be started by the switch data from the winding motor control switch 119. In operation, the regulator 124 supplies the power to the necessary portions of the main control system other than the zoom control system.

The operation of the ZM/C 100 will be described below with reference to FIGS. 16 to 20, which show flow charts of the program stored in the ROM of the ZM/C 100.

The main operation of the apparatus is discussed with reference to FIGS. 16A and 16B, which show the main flow charts of the operation. A CPU of ZM/C 100 is supplied with electrical power through a ragulator 105 by a battery 106 which is received in a battery case to carry out the initializing process at step S1.

After that, the switch scan control process is performed at step S2. After the states of the mode selection switch 101, the zoom switch 102, the photometer switch 103 and the zoom encoder 104 are input, whether the photometer switch 103 is turned OFF in accordance with the input data is checked at step S3.

While the photometer switch 103 is turned ON, the operations of steps S2 and S3 are repeated, until the photometer switch 103 is turned OFF. If photometer switch 103 is turned OFF, the control proceeds to step S4.

At step S4, whether the zoom motor operation prohibiting signal DIS from MC/U 109 is turned ON (e.g. "1") is checked. If the DIS signal is ON, control proceeds to step S5, and if DIS is OFF (e.g. "0"), control proceeds to step S8.

The DIS signal prohibits the winding motor 111 and the zoom motor 5 from simultaneously rotating to reduce the power consumption of the battery 106. Namely, MC/U 109 makes the signal DIS ON only when MC/U 109 is operated by the winding motor control switch 119 to operate the winding motor 111.

When the DIS signal is ON, power hold signal PH is turned ON (e.g. "1") at step S5. The reason that the power hold signal PH is output at step S5 is that the winding motor 111 can be rotated by the operation of the MC/U 109, which is in turn operated by the winding motor control switch 119 under a special condition, i.e. only when the rotation is permitted by the power hold signal PH from the ZM/C 100, so that the zoom motor 5 and the winding motor 111 can not be rotated at the same time.

At step S6, the operation is stopped until the DIS signal from the MC/U 109 is turned OFF, that is, until the control of rotation of the winding motor 111 by the MC/U 109 is completed. When the DIS signal is turned OFF, the power hold signal PH is turned OFF (e.g. "0") to turn the regulator 124 OFF at step S7. After that, the control is returned to step S2. Note that even when the regulator 124 is turned OFF, the supply of electrical power, for example, to the indicator 115 can be partly continued.

When the DIS signal is OFF, the states of the switches are input at step S8, similarly to step S2. At step S9, the zoom codes ZP0~ZP3 from the zoom encoder 104 are converted to POS (FIGS. 9 and 10).

After conversion to POS, the position (mode) is detected (LOCK position, MACRO position or ZOOM position) at step S10 in accordance with data inputted at step S8. When the modes are LOCK, ZOOM and MACRO, the control proceeds to steps S11, S14 and S16, respectively.

When the mode is LOCK, the results of the conversion into POS at step S9 is checked at step S11 to determine whether POS=0. If POS=0, the control is returned to step S2, and if POS≠0, the control proceeds to step S12 to rotate the zoom motor 5 in the forward direction at high speed (see the rotation control command RCM in Table 2). After an RV sub-routine (which will be discussed hereinafter) is performed at step S12, control is returned to step S2.

In case of the ZOOM mode, whether the result of conversion into POS satisfies POS≦1 is checked at step S14. If POS≦1, the control proceeds to step S17 to rotate the zoom motor 5 at a high speed in the forward direction (see the rotation control command RCM in Table 2). After FW sub-routine (which will be discussed below) is called and carried out at step S17, control is returned to step S2.

If POS≧2, whether the result at step S9 satisfies POS≧B is checked at step S15. If POS≧B, the zoom motor 5 is reversed at high speed at step S12. After RV sub-routine (which will be described hereinafter) is called and carried out, control is returned to step S2.

If POS≦A, POS is judged to be 2≦POS ≦A, and control proceeds to step S18.

In the case of the MACRO position, the result at step S9 is checked at step S16. If POS=C, the control is jumped to step S22. If POS≠C, the zoom motor 5 is rotated at a high speed in the forward direction at step S17 at which FW sub-routine (which will be explained below) is called and carried out. After that, control is returned to step S2.

At step S18, whether the zoom switch 102 is switched to TELE (TELE ON) in accordance with the date inputted at step S8 is checked. If TELE is ON, a TELE sub-routine (which will be described below) is called and carried out at step S19. After that, control is returned to step S2. If TELE is OFF, control proceeds to step S20.

At step S20, whether the zoom switch 102 is switched to WIDE (WIDE ON) in accordance with the data input at step S8 is checked. If WIDE is ON, a WIDE sub-routine (which will be described below) is called and carried out at step S21. After that, control is returned to step S2. If WIDE is OFF, control proceeds to step S22.

At step S22, whether the photometer switch 103 is turned ON in accordance with the data input at step S8 is checked. If the photometer switch 103 is not turned ON, control is returned to step S4. If the photometer switch is ON, control proceeds to step S23.

The following discussion is directed to the operation of a camera to which the present invention is applied, including the operations of the RV sub-routine at step S12, the FW sub-routine at step A17, the TELE sub-routine at step S19 and the WIDE sub-routine at step S21.

Figure 17:
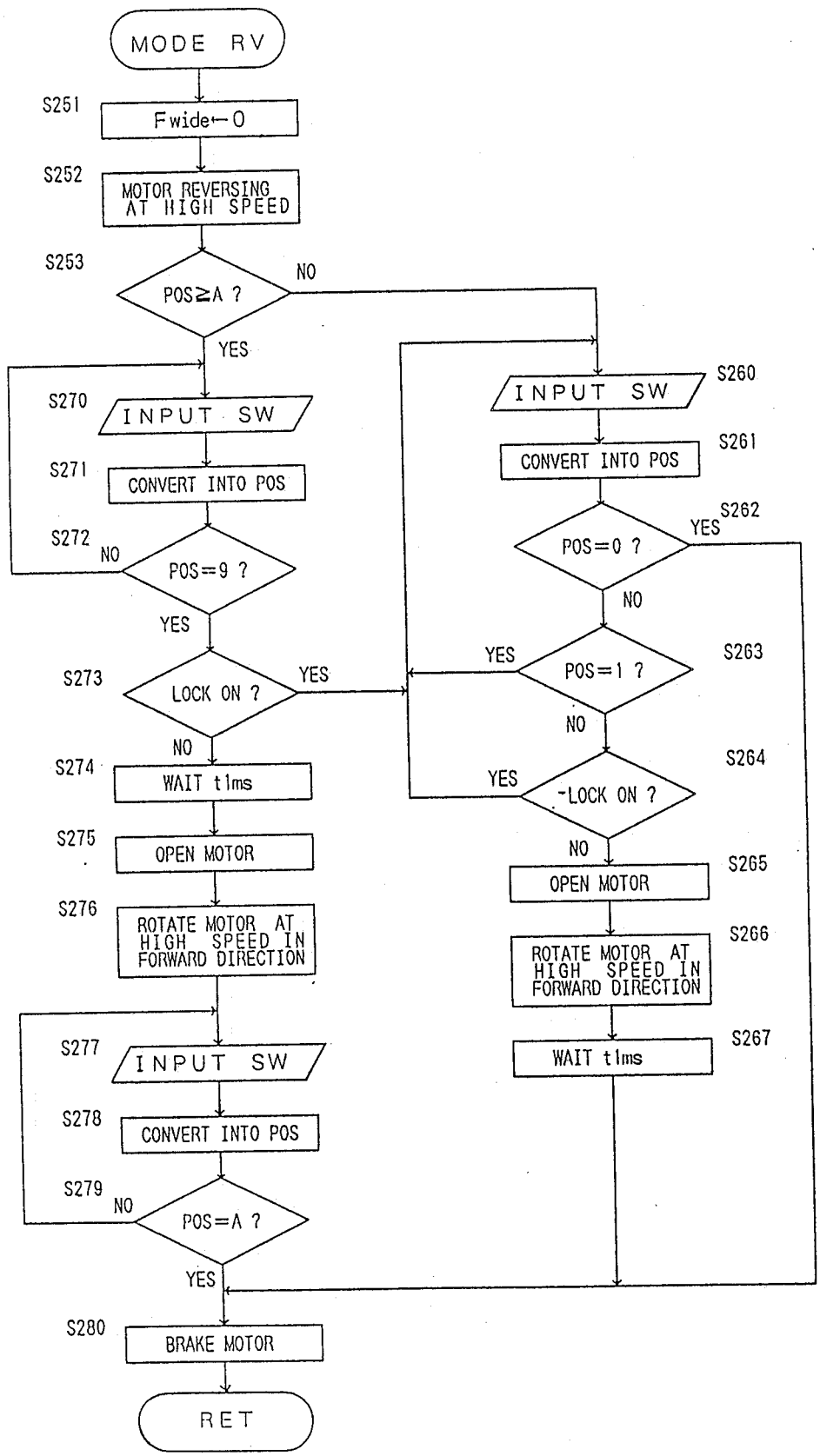

In FIG. 17, which shows a flow chart of the RV sub-routine, when the RV sub-routine is called, CPU of ZM/C 100 resets a WIDE extremity flage Fwide to "0" at step S251 so as to rotate the zoom motor 5 at a high speed in the reverse direction at step S252. Note that the WIDE extremity is POS=2; f0 in FIGS 9 and 10. At step S253, whether POS≧A is checked. If POS<A, control proceeds to step S260. If POS ≧A, control proceeds to step S270.

At steps S260, S261, S270 and S271, the conversion into POS is carried out in a manner similar to steps S8 and S9 in FIG. 16A.

At step S261, the result of the conversion at step S261 is checked. If POS=0, i.e., the mode is in the LOCK position, control jumps to step S280 to brake the zoom motor 5 to stop the same. After that, control is returned to step S2 in FIG. 16A.

If POS≠0, control proceeds to step S263 at which the result of conversion into POS is checked. If POS=1, control is returned to step S260, and if POS≠1, control proceeds to step S264. Namely, steps S260~S263 form a check loop of POS values to determine whether POS=0 or POS=1.

At step S264, whether the mode selection switch 101 is in the LOCK position is checked. If the mode is LOCK, control is returned to step S260. If the mode is not LOCK, control proceeds to step S265.

At steps S265, S266 and S267, the zoom motor 5 is rotated at high speed in the forward direction after the motor drive circuit 107 is opened (Table 3). Control proceeds to step S280 t1 msec thereafter, so that the zoom motor 5 is braked and stopped. After that, control is returned to step S2 in FIG. 16A. The steps S265~S267 are for the removal of the backlash.

At step S272, whether the result of conversion into POS at step S271 is POS=9 is checked. If POS≠9, control is returned to step S270, and if POS=9, control proceeds to step S273. Steps S270~S272 form a check loop for checking the POS value.

At step S273, whether the mode selection switch 101 occupies the LOCK position is checked in a manner similar to step S264. If the mode is LOCK, control proceeds to step S260 and if the mode is not LOCK, control proceeds to step S274.

At steps S274, S275 and S276, the motor drive circuit 107 is opened after the lapse of t1 msec (Table 3), and then, the zoom motor 5 is rotated at a high speed in the forward direction. After that, control proceeds to steps S277 and S278 to perform the conversion into POS, in a manner similar to steps S8 and S9 in FIG. 16A. After the conversion, control proceeds to step S279 at which the converted value of POS at step S278 is checked to see if it is equal to POS=A (TELE extremity).

If POS≠A, control is returned to step S277 and if POS=A, control proceeds to step S280 so as to brake the zoom motor 5 and thereby stop the same. After that, the control is returned to step S2 in FIG. 16A. Steps S277~279 form a check loop of POS values for checking whether POS is A.

The discussion will be continued below with the flow chart of the FW sub-routine (FIG. 18) shown in FIG. 18. When the FW sub-routine is called, the CPU of ZM/C 100 resets the WIDE extremity flag Fwide to "0" at step S301 so as to rotate the zoom motor 5 at a high speed in the forward direction at step S302. Note that the WIDE extremity is POS=2; f0 in FIGS. 9 and 10. At step S303, whether POS≦1is checked. If POS is not POS≦1, control proceeds to step S310, and if POS≦1, control proceeds to step S320.

At steps S310, S311, S320 and S321, the conversion into POS is carried out in a similar manner to steps S8 and S9 in FIG. 16A.

At step S312, the result of the conversion at step S311 is checked. If POS=C, i.e. if the mode is in the MACRO position, control jumps to step S325 to brake the zoom motor 5 so as to stop the same. After that, control is returned to step S2 in FIG. 16A.

If POS≠C, control proceeds to step S313, at which the result of conversion into POS is checked to be POS≧A. If POS≧A, control is returned to step S310, and if POS is not POS≧A, control proceeds to step S314. Steps S310~S313 form a check loop of POS values.

At step S314, whether the mode selection switch 101 is in the MACRO position is checked. If the mode is MACRO, control is returned to step S310. If the mode is not MACRO, control proceeds to step S325.

At step S322, the result of the conversion is checked to determine if POS=2 (WIDE extremity). If POS≠2, control is returned to step S320. If POS=2, control proceeds to step S323. Steps S320~S323 form a check loop of POS values.

At step S323, whether the mode selection switch 101 occupies the MACRO position is checked in a similar manner to step S314. If the mode is MACRO, control proceeds to step S310 and if the mode is not MACRO, control proceeds to S324.

At step S324, the WIDE extremity flag Fwide is set to be "1", so that the zoom motor 5 can be braked and stopped at step S325. Then, control is returned to step S2 in FIG. 16A.

Mode switch 101 is switched. In this operation, the zoom motor 5 rotates at a high speed until the cam ring moves to a desired position.

Figure 19:
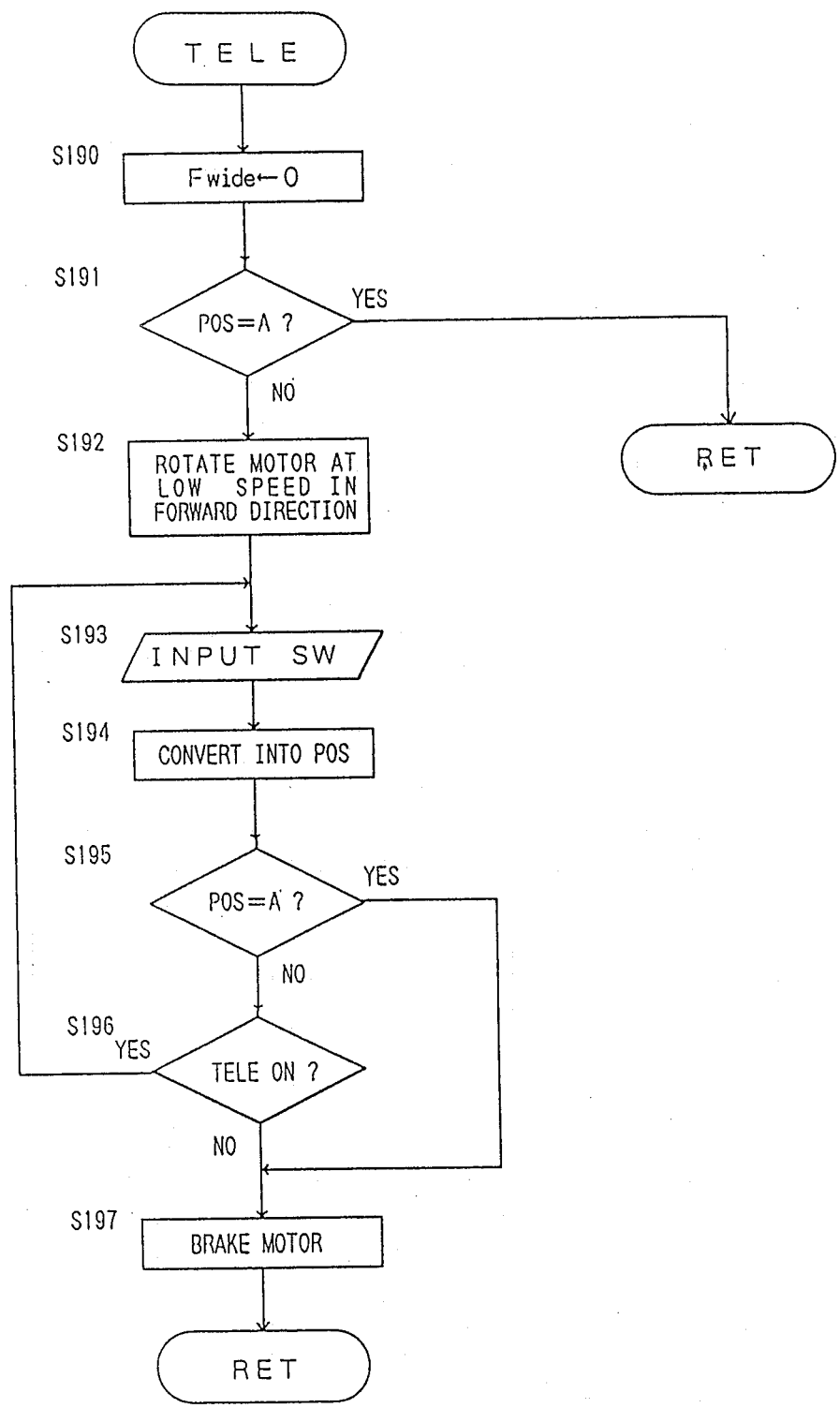

The following description will be addressed to the operation in which the zooming is effected toward TELE side, with reference to FIG. 19 which shows a flow chart of TELE sub-routine. When the TELE sub-routine is called the CPU of ZM/C 100 resets the WIDE extremity flag Fwide to "0" at step S190.

At step S191, whether the result of conversion at step S9 is POS=A is checked. If POS=A, control is returned to step S2 in FIG. 16A and if POS≠A, i.e. if 2≦POS≦9 in the illustrated embodiment, control proceeds to step S192 to rotate the zoom motor 5 at a relatively low speed in the forward direction.

After the conversion into POS is carried out at steps S193 and S194 similarly to steps S8 and S9 in FIG. 16A, whether the result of the conversion at step S194 is POS=A (TELE extremity) is checked at step S195. If POS=A, control is skipped to step S197 to stop the zoom motor 5. After that, control is returned to step S2 in FIG. 16A. Steps S193~S195 form a check loop of POS values.

If POS≠A, whether the zoom switch 102 is switched to TELE side (TELE ON) in accordance with the data input at step S193 is checked at step S196. If TELE is ON, control is returned to S193 and if TELE is OFF, the zoom motor 5 is stopped at step S197. After that, control is returned to step S2 in FIG. 16A.

The zooming operation toward the WIDE side will be explained below with reference to FIG. 20, which shows a flow chart of the WIDE sub-routine.

When the WIDE sub-routine is called, the CPU of ZM/C 100 checks at step S210 whether Fwide=1, i.e. whether the zoom motor 5 is stopped at the WIDE extremity. If Fwide=1, control is immediately returned to step S2 in FIG. 16A, and if Fwide722 proceeds to step S211.

At step S211, the zoom motor 5 is reversed at low speed, and then, the operation is stopped for predetermined time of t2 msec to eliminate backlash. After the lapse of t2 msec, the conversion into POS is effected at steps S213 and S214, similar to steps S8 and S9. After that, at step S215, whether POS=1 is checked. If POS=1, control proceeds to step S216 and if POS≠1, control proceeds to step S223. Steps S213~S215 form a check loop at POS values.

At steps S216 and S217, the zoom motor 5 is rotated at low speed in the forward direction t2 msec thereafter. At steps S218 and S219, the conversion into POS is effected, similar to steps S8 and S9 in FIG. 16A. At step S220, whether the result of conversion at step S219 is 2 (POS=2) is checked. If POS≠2, control is returned to step S218. If POS=2, the WIDE extremity flag Fwide is set to be "1" and the zoom motor 5 is braked to be stopped at steps S221 and S222, respectively. After that, control is returned to step S2. Steps S218~S220 form a check loop of POS values.

If POS≠1 at step S215, control proceeds to step S223 to check whether the zoom switch 102 is still in the WIDE position (WIDE ON). If the zoom switch is WIDE, control is returned to step S213 and if WIDE is OFF, control proceeds to step S224.

At steps S224, S225 and S226, the zoom motor 5 is braked and stopped after it is rotated in the forward direction at low speed for t2 msec to remove backlash. After that, control is returned to step S2.

Differences in time between the waiting time and the continuation time of t2 msec of the forward rotation, in the WIDE sub-routine and the waiting time and the continuation time of t1 msec of the forward rotation in the RV sub-routine are caused by the difference in rotational speed of the zoom motor 5 therebetween.

The operation of steps S1~S22 in FIG. 16A and steps shown in FIGS. 17 to 20 will be explained below. Note that these steps are performed by the CPU in the ZM/C 100.

I. When the winding motor control switch 119, the release button 99 and the zoom switch 102 are not operated after the battery 106 is charged in the battery case:

(a) The case where the mode selection switch 101 is in LOCK;

The CPU in the ZM/C 100 performs the initialization at step S1 shown in FIG. 16A. After that, under the condition that the angular position of the cam ring 14 which determines the movement of the front lens group L1 and the rear lens group L2 is in the LOCK position, i.e. POS=0, the operation of the LOCK loop of S2-S4

S8-S11-S2 is repeated, so that no camera operation is effected. In this moment, if release button 99 is pushed to make the photometer switch 103 ON, the operations of steps S2 and S3 are repeated until the photometer switch 103 is made OFF. Namely, the operation of the release button 99 is nulled.

If the angular stop position of the cam ring 14 is not POS=0, control proceeds to step S12 from step S11, so that the cam ring 14 is brought to be POS=0 by the operations of the RV sub-routine in FIG. 17. Consequently, control is returned to step S2.

Note that CPU of ZM/C 100 repeats the operation of the LOCK loop of S4-S8-S11-S4, provided that no camera operation is done, after control is returned to step S2.

(b) The case where the mode selection switch 101 is switched to ZOOM from LOCK;

CPU of ZM/C 100 performs the operation in step S14 through the above-mentioned first loop. In this moment, since POS=0, control proceeds to step S17 from step S15. Namely, the FW sub-routine shown in FIG. 18 is performed. At step S302, the zoom motor 5 is rotated at high speed in the forward direction. After that, control proceeds to step S320 through step S303. After that, the operations in the POS check loop of steps S320~S322 are repeated until POS=2.

When POS=2, control proceeds to step S323, so that the zoom motor 5 is rotated at step S325 through step S324 the under condition that the mode selection switch 101 in not switched to MACRO. After that, control is returned to step S2 in FIG. 16A. In this case, the angular stop position of the cam ring 14 is the WIDE extremity (POS=2), in which the focal length is f0 as shown in FIG. 10. Note that the operations of the ZOOM loop of S4-S8-S10-S14-S15-S18-S20-S22-S4 are repeated after control is returned to step S2, so long as no camera operation is done.

(c) The case where the mode selection switch 101 is switched to MACRO from LOCK or ZOOM when the cam ring 14 is stopped at LOCK (POS=0) or at WIDE extremity (POS=2);

In the CPU of ZM/C 100, the operations are transferred to step S16 from step S10 of the above-mentioned zoom loop. In this case, since POS≦9, the opertion (S17) in the FW sub-routine shown in FIG. 18 is performed. Namely, the zoom motor 5 is rotated at high speed in the forward direction at step S302 and the following operations are effected:

When the stop position of the cam ring 14 is POS≦1, control proceeds to S320 from S303, so that the operations in the POS check loop of S320~S322 are repeated until POS=2.

When POS=2, control proceeds to step S310 under the condition that the MACRO position of the mode selection switch 101 is checked at step S323. The subsequent operations are similar to those in the case where the stop position of the cam ring 14 is POS≧2.

When the stop angular position of the cam ring 14 is POS≧2, control proceeds to S310 from S303, so that the operations in the POS check loop of steps S310~S314 are repeated until POS=C. This loop operation is repeated until POS≧A, provided that the MACRO position of the mode selection switch 101 is detected at step S314.

When POS≧A, the operations of the POS check loop of S310~S313 except for S314 are repeated until POS=C.

When POS=C, the zoom motor 5 is immediately stopped at step S325, so that the cam ring 14 is stopped at the MACRO position of POS=C. Thus, control is returned to step S2 in FIG. 16. After that, the operations of the MACRO loop of S4-S8-S10-S16-S22-S4 are repeated, provided that no camera operation is effected.

(d) The case where the mode selection switch 101 is switched from MACRO to ZOOM when the cam ring 14 is stopped at the MACRO position (POS=C);

In the CPU of ZM/C 100, control proceeds to S14 from S10 of MACRO loop mentioned above. In this operation, since POS=C, the control proceeds through S14 and S15 to S12, i.e. the RV sub-routine shown in FIG. 17, so that the zoom motor 5 is reversed at high speed at step S252. After that, control proceeds to S270 through S253 and then the operations of the POS check loop of S270~S272 are repeated until POS=9.

When POS=9, control proceeds to S273 from S272. After that, the zoom motor 5 is switched from the high speed reversing to high speed forward rotation at steps S275 and S276 after the lapse of t1 msec at step S274, provided that the mode selection switch 101 is not switched to LOCK, which can be checked at step 273. After that, the operations of the POS check loop of S277~S279 are repeated until POS=A.

When POS=A, the zoom motor 5 is stopped and control is returned to step S2 to await a subsequent operation. Namely, the angular stop position of the cam ring 14 is the TELE extremity (POS =A) in which the focal length is f7' in FIG. 10.

Similarly to the above-mentioned case (b), the CPU of ZM/C 100 repeats the operations of the zoom loop under the condition that no camera operation is effected, and afterwards control is returned to step S2.

The operations of S274~S276 are necessitated for the following reason:

When the mode is switched from MACRO to ZOOM, the cam ring 14 is stopped as soon as it comes to POS=A from POS=9. If the zoom motor 5, which has been rotated in the reverse direction, is rotated in the forward directin to be stopped at POS=A immediately after the cam ring comes to POS=9 from POS=A, there is a possiblity that the zoom motor 5 is stopped with a backlash of gears or the like in a drive transmission mechanism of the zoom motor 5. However, if the zoom motor 5 continues reversing for a period of t1 msec at POS=9, the physical displacement of travel of the cam ring to the position of POS=A is increased. Accordingly, if the direction of rotation of the zoom motor 5 is changed from reverse to forward after t1 msec, the possible backlash can be sustantially or completely eliminated when the cam ring is stopped at POS=A.

In this case, since the zoom motor 5 rotates at high speed, the continuation time for eliminating backlash is set to be t1 msec. It should be noted however, that the continuation time is set to be t2 msec, which is longer than t1 msec (t2>t1) during the zooming operation which will be described hereinafter, since the zoom motor 5 rotates at a relatively low speed during the zooming operation. Namely, the physical displacement of travel of the cam ring is made constant in any mode, regardless of the rotational speed of the zoom motor 5.

(e) The case where the mode selection switch 101 is switched from MACRO to LOCK when the cam ring 14 is stopped at the MACRO position (POS=C);

Control proceeds to step S11 from step S10 of the above-mentioned MACRO loop. In the case POS=C, the control proceeds to step S12, i.e. the RV sub-routine shown in FIG. 17, as mentioned before. At step S252, the cam ring 14 is reversed at high speed to bring the cam ring 14 to the LOCK position (POS=0). After that, control proceeds to step S270 through step S273, so that the operations of the POS check loop of steps S270~S272 are repeated until POS=9.

When POS=9, whether the mode selection switch 101 is in the LOCK position is checked at step S273, as described above. When the mode selection switch 101 is in the LOCK position, the control proceeds to step S260, so that the operations of steps the POS check loop of S260~S263 are repeated until POS=0.

When POS=0, the zoom motor 5 is stopped at step S280, so that the cam ring 14 is stopped at the LOCK position of POS=0. Thus, control is returned to step S2 in FIG. 16A to perform the subsequent operations.

(f) The case where the mode selection switch 101 is switched from ZOOM to LOCK when the cam ring 14 is stopped at the zoom position ($2 \leq POS \leq A$);

Control proceeds to step S11 from S10 of the above-mentioned MACRO loop. Since $2 \leq POS \leq A$, control proceeds to step S12, i.e. the RV sub-routine shown in FIG. 17, so that at step S252, the zoom motor 5 is reversed at hihg speed. After that, control proceeds to the POS check loop of S260~S264 from step S253.

When POS=A, control enters the POS check loop of S260~S264 through the above-mentioned steps S270~S273. In this loop, whether the mode selection switch 101 is in the LOCK position is checked at step S264, so that if it is in the LOCK position, the operations are repeated until POS=0. When POS=0, control proceeds to step S280 from step S262 to step the zoom motor 5 to thereby stop the cam ring 14 at POS=0. After that, control is returned to step S2, shown in FIG. 16A, perform the subsequent operations.

Note that after the control is returned to step S2, CPU of ZM/C 100 repeats the operations of steps the LOCK loop of S4-S8-S11-S4, so long as no camera operation is effected.

(g) The case where the mode selection switch 101 is switched from ZOOM to MACRO when the cam ring 14 is stopped at the ZOOM position ($2 \leq POS \leq A$);

The cam ring 14 is stopped at the MACRO position by the operations similar to those of case (c) above, where the angular stop position of the cam ring 14 is POS$\geq$2 to repeat the operations of the MACRO loop under the condition that no other operation is effected.

Figure 18:
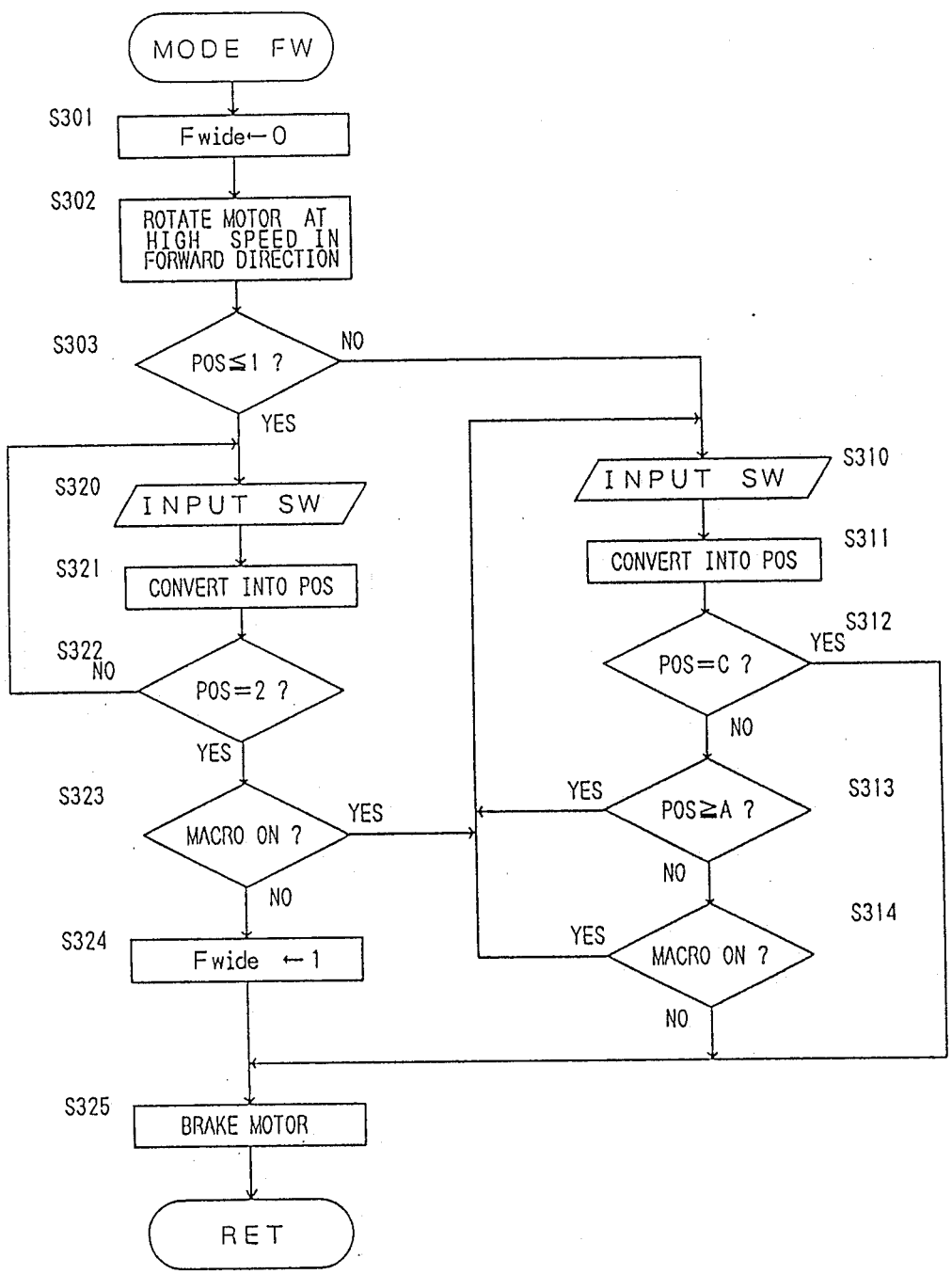

(h) The case where the mode selection switch 101 is switched to LOCK or ZOOM during the operation thereof at the MACRO position, as mentioned in the above (c);

At step S314 or S323 in FIG. 18, that the mode selection switch 101 is not in the MACRO position is checked. After that, the CPU of ZM/C 100 performs the following operations:

If the mode is switched at $0 \leq POS \leq 1$, POS=2 is checked at step S323, and the zoom motor 5 is stopped to stop the cam ring 14 at the WIDE extremity at step S325. After that, control is returned to step S2 to perform the subsequent operations.

If the mode is switched at $2 \leq POS \leq 9$, the switching is checked at step S314, and the zoom motor 5 is immediately stopped at step S325. After that, the control is returned to step S2. If the mode selection switch 101 is switched to ZOOM at $2 \leq POS \leq 9$, the angular stop position of the cam ring 14 is an optional position in which the focal length shown in FIG. 10 is any one of f0~f7.

If the mode is switched at $A \leq POS \leq C$, which is not checked, the operations of steps the loop of S310~S313 are repeated until POS=C. When POS=C, control proceeds to S325 from S312 to stop the zoom motor 5 in order to step the cam ring 14 at the MACRO position. After that, control is returned to step S2 to perform the subsequent operations.

(i) The case where the mode selection switch 101 is switched to MACRO or ZOOM during the LOCK operation in the above-mentioned (e) and (f);

At steps S264 and S273 in FIG. 17, that the mode selection switch 101 is switched to a position other than the LOCK position is checked. After that, the CPU of ZM/C 100 performs the following operations:

If the mode is switched to a position other than the LOCK position at POS$\geq$A, POS=9 is checked at step S273 and the operations of steps S274~S275 are carried out. After that, the operations of the POS check loop of steps S277~S279 are repeated. When POS=A, the zoom motor 5 is stopped so as to stop the cam ring 14 at the TELE extremity at step S280. After that, control is returned to step S2 to perform the subsequent operations.

If the mode is switched to a position other than LOCK at $2 \leq POS \leq 9$, which is checked at step S264, the operations for eliminating the backlash are immediately performed at steps S266 and S267, and the zoom motor 5 is stopped at S280. After that, control is returned to step S2. Namely, the angular stop position of the cam ring at $2 \leq POS \leq 9$ is an optional position in which the focal length shown in FIG. 10 in any one of f0~f7.

If the mode is switched to a position other than LOCK at POS$\leq$1, which is not checked, the operations of steps the loop of S260~S263 are repeated until POS=0, which is checked at step S262. When POS=0, the zoom motor 5 is stopped so as to stop the cam ring 14 at the LOCK position. After that, control is returned to step S2 to perform the subsequent operations.

In summary, according to the illustrated embodiment, when the mode selection switch 101 starts the operation at the LOCK position or the MACRO position, even if the mode selection switch is switched to other position from LOCK or MACRO at $0 \leq POS \leq 2$ or $A \leq POS \leq C$, the initial operation continues to stop the cam ring at any one of POS=0, 2, A and c. After that, the operations of the desired mode switched form LOCK or MACRO can be commenced.

Figure 16:
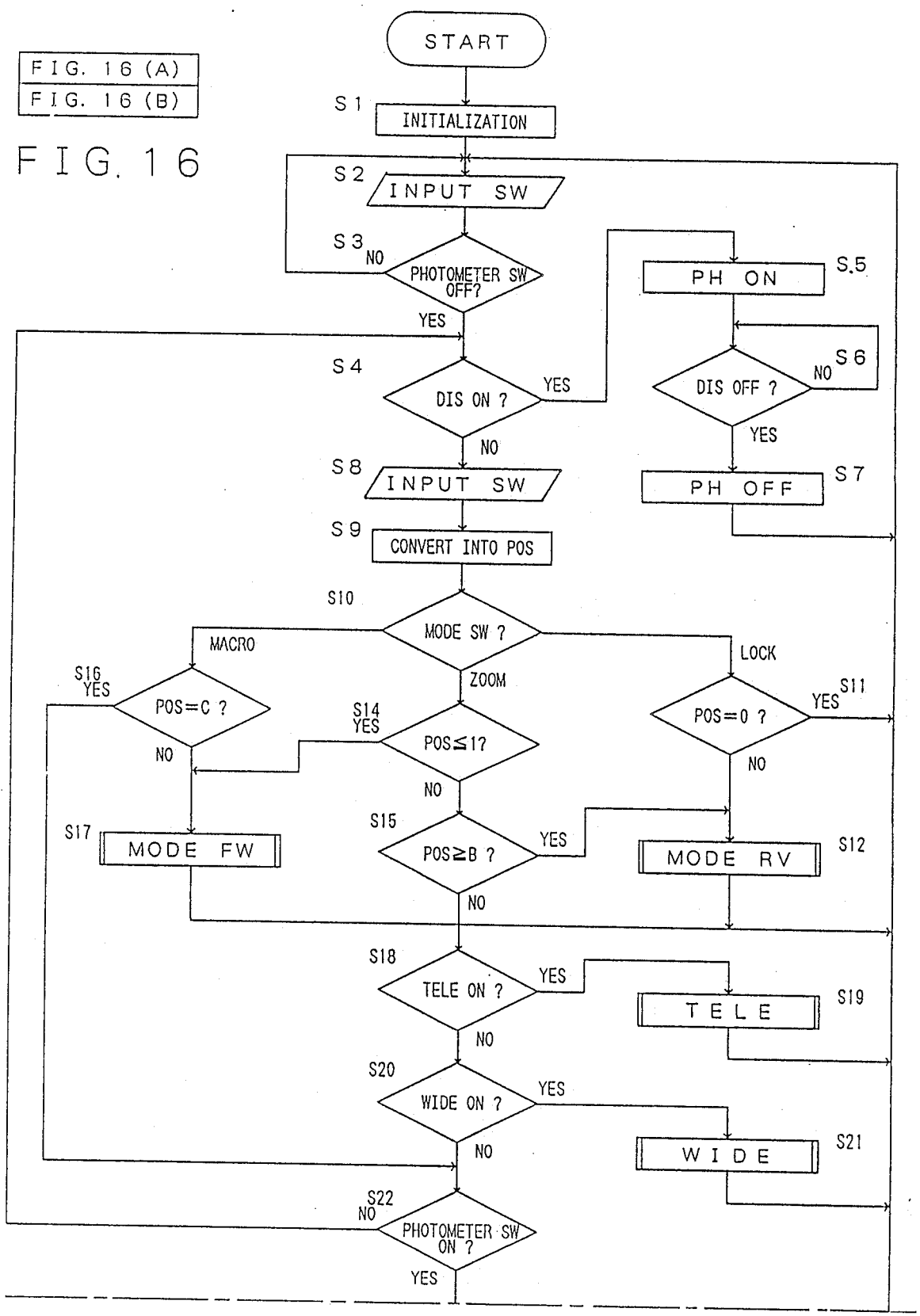
FIGS. 16A, 16B, 17, 18, 19 and 20 are flow charts of the operations of a camera according to the present invention.
Figure 16:
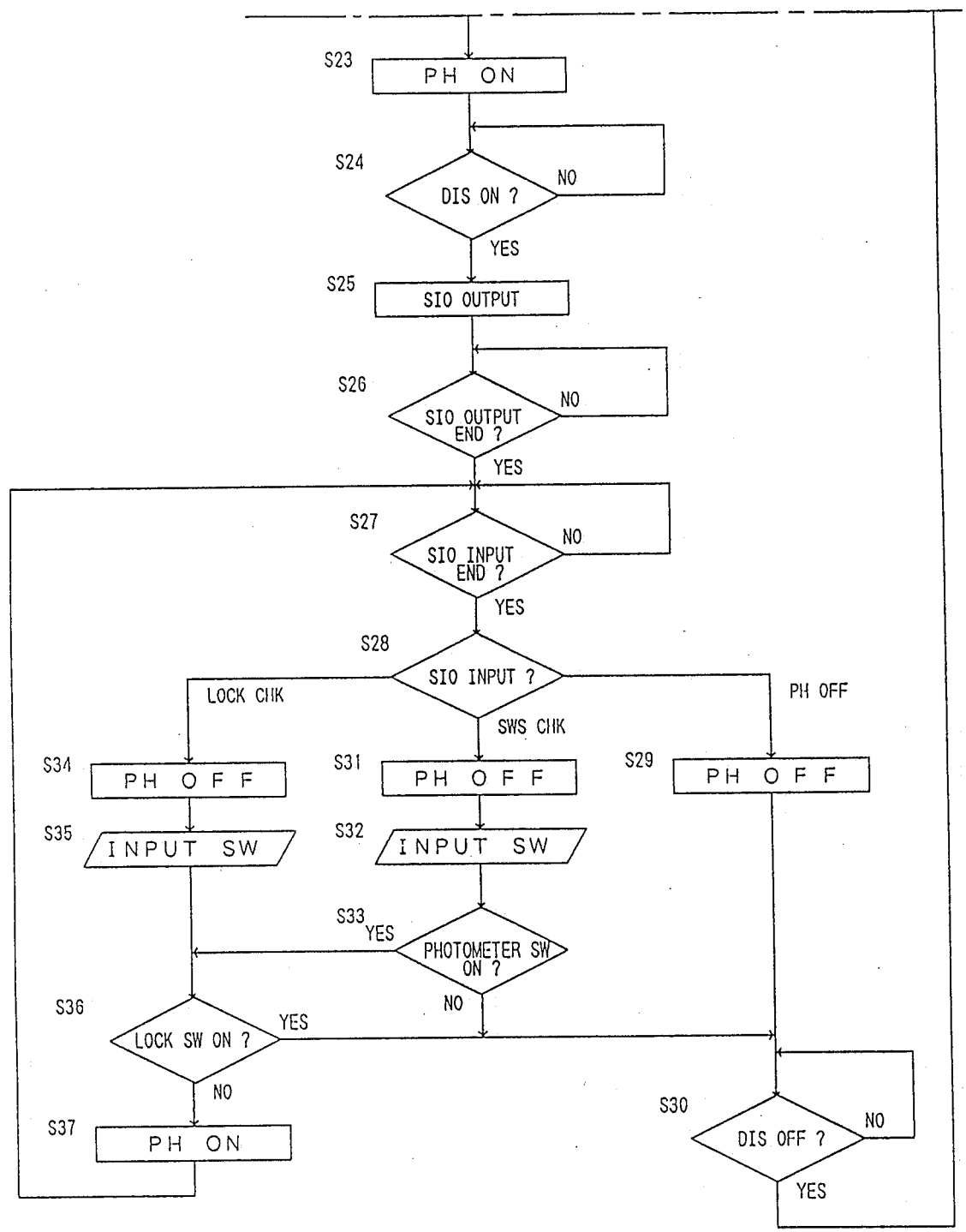

II. When the winding motor control switch 119 is actuated during the performance of the operations of the above-mentioned LOCK loop or ZOOM loop etc. by the CPU of ZM/C 100:

Since the zoom motor operation prohibiting signal DIS is made ON by the CPU of CM/U 109, the CPU of ZM/C 100 performs the operation of step S5 through step S4 shown in FIG. 16. At step S5, the power hold signal PH is outputted (ON) to permit MC/U 109 to rotate the winding motor 111, so that the CPU of MC/U 109 can commence the control of rotation of the winding motor 111.

When the zoom motor operation prohibiting signal DIS is made OFF, at the completion of the control of the winding motor 111 by the MC/U 109, control of the CPU of ZM/C 100 proceeds to step S7 from step S6 to make the power hold signal PH OFF. After that, control is returned to step S2.

Since the operations are branched from the abovementioned LOCK, MACRO and ZOOM operation loops into steps S4~S7, not only the operation of the zoom motor 5 is prohibited during the operation of the winding motor 11, but also the operations of the photometer switch 103 and the release switch 123 are nulled.

III. When the zoom switch 102 is switched toward TELE side during the operation of the zoom loop by the CPU of ZM/C 100:

The control of the CPU of ZM/C 100 proceeds to step S19 from step S18, shown in FIG. 16A, to call and perform the TELE sub-routine shown in FIG. 19.

At step S190, the WIDE extremity flag Fwide is reset to "0". After that, if the angular stop position of the cam ring 14 is the TELE extremity of POS=A, no rotation of the zoom motor 5 is necessary, and accordingly, control is immediately returned to step S2, shown in FIG. 16A. On the other hand, if the angular stop position of the cam ring 14 is other than the TELE extremity, the zoom motor 5 is rotated at a low speed in the forward directioon at step S192, and then control does not proceed until the cam ring 14 comes to POS=A, provided that the zoom switch 102 is not returned to the neutral position from the TELE side in the loop of steps S193-S196-S193. Note that when the TELE sub-routine is called, POS is $2 \leq POS \leq 9$. When POS=A, the zoom motor 5 is stopped at step S197 and then control is returned to step S2 in FIG. 16A.

As can be understood from the foregoing, when the zoom switch 102 is moved to the TELE side, the cam ring 14 is stopped at the TELE extremity, so long as the TELE operation is maintained. However, if the zoom switch 102 is released, to be returned to the neutral position on the way to the TELE extremity, control proceeds to step S197 from step S196 to immediately stop the zoom motor 5. Namely, by returning the zoom switch 102 to the neutral position from the TELE side at a desired timing, the cam ring 14 can be stopped at an optional position (optional focal length) corresponding to $2 \leq POS \leq 9$.

Figure 20:
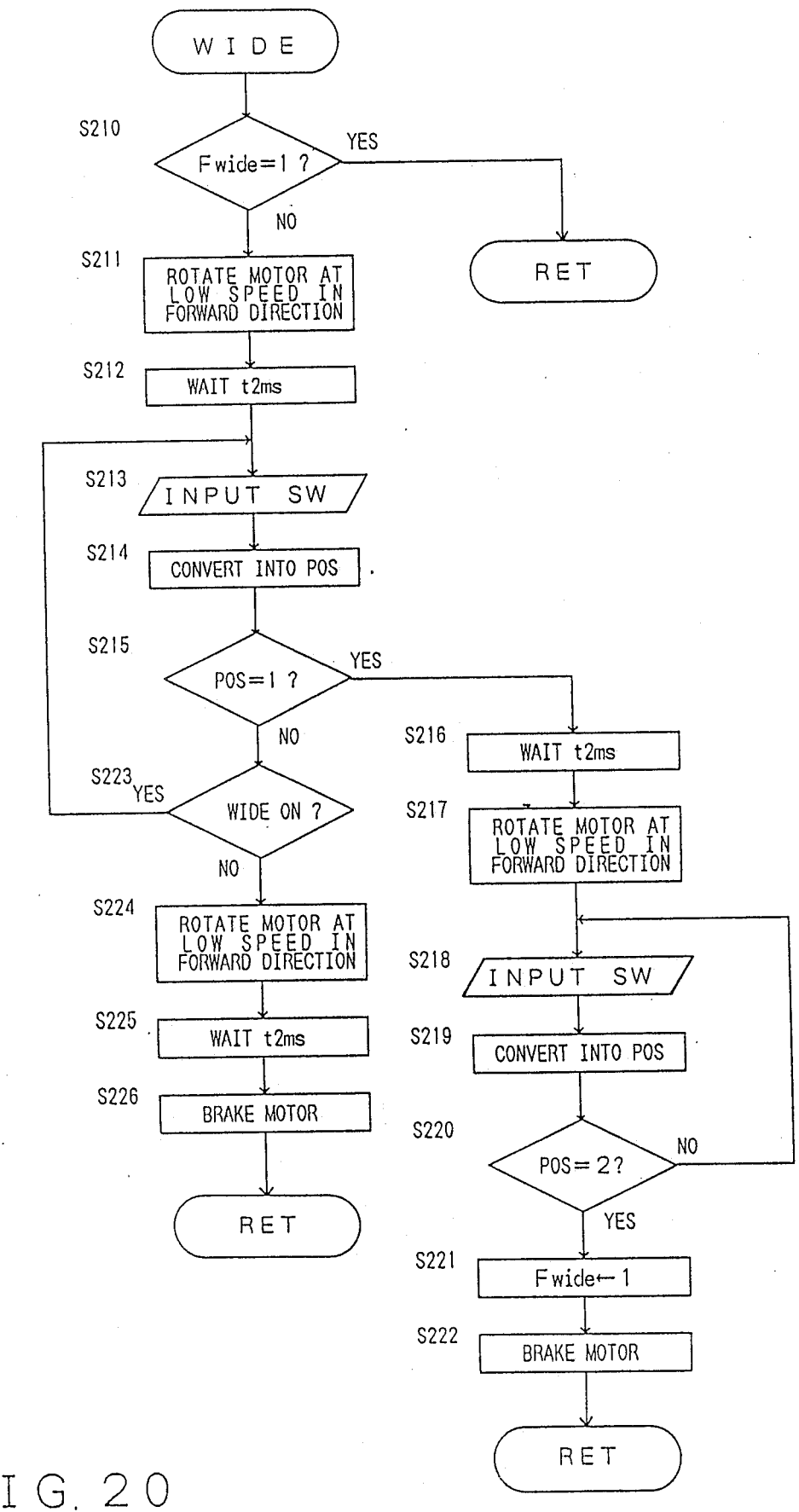

IV. When the zoom switch 102 is moved toward the WIDE side during the operation of the zoom loop by the CPU of ZM/C 100:

Control proceeds to step S21 from step S20 in FIG. 16A to call and perform the WIDE sub-routine shown in FIG. 20.

At step S210, whether the WIDE extremity flag Fwide is "1" is checked. If Fwide=1, the angular stop position of the cam ring 14 is the WIDE extremity (POS=2), and accordingly no rotation of the zoom motor 5 is necessary. Therefore, control is immediately returned to step S2 in FIG. 16A. If Fwide=0, the zoom motor 5 is reversed at low speed at step S211.

The subsequent operation waits for t2 msec at step S212. This is because if the zoom switch 102 is returned to the neutral position as soom as the actuation of the zoom switch toward the WIDE side is completed, the displacement of reverse of the zoom motor 5 is uncertain, so that there is a possibility that the movement for eliminating the backlash mentioned above at steps S224 and S225 becomes larger than the necessary displacement.

After the completion of the operation at step S212, control does nto proceed until the angular stop position of the cam ring 14 becomes POS=1, provided that the zoom switch 102 is not returned to the neutral position from the WIDE side in the loop of steps S213-S215-S223-S213.

When POS=1, the operations similar to those in steps S165 and S166 are carried out at steps S216 and S217, and the loop operation of S218-S220-S218 is performed to eliminate backlash. The control does not proceed until POS=2.

When POS=2 (WIDE extremity), Fwide is set to be "1" at step S221 and the zoom motor 5 is stopped. After that, control is returned to step S2, shown in FIG. 16A.

As can be seen from the above discussion, when the zoom switch 102 is moved to the WIDE side, the cam ring 14 is stopped at the WIDE extremity so long as the WIDE operation is maintained.

It goes without saying that if the zoom switch 102 is released to be returned to the neutral position on the way to the WIDE extremity, the operations for eliminating the backlash are performed at steps S224 and S225 through step S223 and then, the zoom motor 5 is stopped at step S226. Namely, by returning the zoom switch 102 to the neutral position from the WIDE side at a desired timing, the cam ring 14 can be stopped at an optional position (optional focal length) corresponding to $2 \leq POS \leq 9$.

Finally, the operations subsequent to step S22 in FIG. 16A will be discussed below.

If the release button 99 is actuated to make the photometer switch 102 ON during the performance of the operations of the zoom loop by the CPU of ZM/C 100, control proceeds to step S23 from step S22 (provided that the winding motor control switch 119 is not made ON).

At step S23, the power hold signal PH is made ON to operate MC/U 109. Then, at step S24, the operation of MC/U 109 is confirmed by checking whether the zoom motor operation prohibiting signal DIS from MC/U 109 is made ON. After confirmation, the results (zoom code data) of conversion into POS at step S9 is set in the output register to effect a serial transfer of the zoom code data to MC/U 109. At the same time, the zoom code data are carried on the serial signal S10 synchronously with the clock CLK from MC/U 109 to serial-transfer the same to MC/U 109.

After that, at step S26, control does not proceeds until the above-mentioned transfer operation is completed. Then, control proceeds to step S27.

When the serial signal SI which carries thereon the switch check/operation completion data from MC/U 109 is input at step S27, the input data are checked at step S28.

If the input data is END (power hold OFF demand data), which designates the completion of the operation of MC/U 109, control proceeds to step S29, If the input data is SWSCHK (photometer switch check data) or LOCKCHK (LOCK check data of mode selection switch), control proceeds to step S31 or S34.

At step S29, the power hold signal PH is made OFF, since the operation of MC/U 109 is completed. After, at step S30, that the zoom motor operation prohibiting signal DIS from MC/U 109 is made OFF is checked. Control is then returned to step S2.

The power hold signal PH is made OFF at step S31 to give information that the photometer switch 103 is made ON to MC/U 109. After that, the various switch data are input at setp S32, in a manner similar to step S2.

Whether the photometer switch 103 is made ON in accordance with the input data at step S32 is checked at step S33. If the photometer switch 103 is not made ON, control is returned to step S2 after the zoom motor operation prohibiting signal DIS is made OFF at step S30.

When the photometer switch 103 is OFF, the operation at step S31 in which the power hold signal PH is made OFF becomes effective.

If the photometer switch 103 is ON, whether the mode selection switch 101 is switched to the LOCK position is checked at step S36 in accordance with the input data at step S32. If the mode is switched to LOCK, it is not necessary to detect that the photometer switch 103 is ON, and accordingly, control is returned to step S2 through step S30.

If the mode selection switch 101 in not switched to the LOCK position, the power hold signal PH is made ON again at step S37. Then, control is returned to step S27.

Whether the CPU of ZM/C 100 is commanded to give information whether the photometer switch 103 is made ON by MC/U 109, the photometer switch 103 is ON, it is represented by turning the power hold signal PH ON and OFF.

Finally, in a manner similar the photometer switch 103, information whether the mode selection switch 101 is switched to LOCK is given to MC/U 109 at steps S34~S37 and S30.

The zoom code data (conversion results into POS), which are transferred from ZM/C 100 to MC/U 109, and ON data of the photometer switch 103 are utilized in MC/U 109 as follows.

The zoom code data are used control the shutter speed of the shutter block 23 as data representing an open F number which varies in accordance with the magnification. Furthermore, POS=C which represents the MACRO position can be used only to illuminate the indicator in the finder in the indicating apparatus 115 to give a warning to a photographer when the distance data detected by the object distance measuring device 120 is beyond the MACRO range, but also to control the operation of the release switch 123 to null the same.

In addition to the foregoing, the ON data of the photometer switch 103 can be used to control the start of the operation of the photometer 121.

Although the regulator 105 is free to operate once the battery 106 is received in the battery case in the illustrated embodiment, it is also possible to provide a manual switch in a power supply line between the battery 106 and the regulator 105 in order to commence the operation of ZM/C 100 only when a photographer operates the manual switch.

It is understood that although the above description has been directed to a lens shutter type camera, the present invention is not limited thereto and can be applied to a single-lens reflex camera or electronic still camera or the like.

As can be seen from the above discussion, according to the present invention, the zooming operation can be effected at an optimum speed and the transfer of the mode from the zooming area into the MACRO position or the lens retracted position and vice versa can be effected at a high speed within an extremely short space of time, and accordingly, the possibility that a photographer misses the shutter chance can be decreased, resulting in a realization of a very useful and convenient camera.

We claim:

1. A zoom lens driving apparatus adapted for use in a camera having a zoom lens and a mode selection means, said apparatus including a first driving means for moving the zoom lens in an optical axis direction within a zooming range, and a second driving means for selectively moving the zoom lens in and out of the zooming range in accordance with a selection mode selected by the mode selection means, the driving apparatus further comprising a zoom lens driving apparatus which comprises means for varying the speed of the movement of the zoom lens between the first driving means and the second driving means.

2. A zoom lens driving apparatus according to claim 1, wherein the speed of movement at which the zoom lens is moved by the second driving means is larger than the speed at which the zoom lens is moved by the first driving means.

3. A zoom lens driving apparatus according to claim 1, wherein said first driving means comprises constant speed means for maintaining the speed of movement of the zoom lens by the first driving means constant.

4. A zoom lens driving apparatus according to claim 1, further comprising a common zoom motor which drives both the first and second driving means.

5. A zoom lens driving apparatus according to claim 4, further comprising a driving circuit means for driving the zoom motor.

6. A zoom lens driving apparatus according to claim 3, wherein said constant speed means comprises a constant voltage circuit which supplies a predetermined voltage to a zoom motor.

7. A zoom lens driving apparatus according to claim 6, wherein said second driving means comprises a power source which supplies a predetermined voltage, higher than the constant voltage of the constant voltage circuit, to the zoom motor.

8. A zoom lens driving apparatus according to claim 1, further comprising control means for controlling the operation of the first and second driving means.

9. A zoom lens driving apparatus according to claim 8, wherein said control means comprises a microcomputer.

10. A zoom lens driving apparatus according to claim 1, wherein said camera is a lens shutter type of camera.

11. A zoom lens driving apparatus according to claim 9, wherein said zoom lens continuously varies the focal length thereof.

12. A zoom lens driving apparatus according to claim 9, wherein said zoom lens discontinuously varies the focal length thereof.

13. A zoom lens driving apparatus according to claim 11, wherein a lens retracted position in which the zooming lens is accomodated is created at one of the extremities of the zooming range.

14. A zoom lens driving apparatus according to claim 11, wherein a MACRO position is located at the other extremity of the zooming range.

15. A zoom lens driving apparatus according to claim 14, further comprising a cam means for driving the zoom lens, said cam means being capable of rotating or axially moving.

16. A zoom lens driving apparatus according to claim 15, further comprising a detecting means for detecting the angular position and the axial position of the cam means.

17. A zoom lens driving apparatus according to claim 16, wherein the axial position of the zoom lens, both in and out of the zooming range, is detected by said detecting means.

18. A zoom lens driving apparatus according to claim 17, wherein said detecting means is controlled by a microcomputer.

19. A zoom lens driving apparatus according to claim 1, wherein said first driving means comprises a zoom switch which actuates the zoom lens selectively in the optical axis directions.

20. A zoom lens driving apparatus according to claim 1, wherein said second driving means comprises a mode selection switch which forms the mode selection means.

21. A zoom lens driving apparatus according to claim 20, wherein said zoom lens can be moved to selectively occupy an optional position within the zooming range, the MACRO position created at the zooming range and the lens retracted position created at the zooming range in accordance with the mode selected by the mode selection switch.

22. A camera having a zoom lens being movable in a zooming range between a first limit position and a second limit position, said camera comprising a driving means, said driving means including a first mode for positioning said zoom lens at selected positions within said zooming range and a second mode for moving said zoom lens to at least one of said first and second limit positions, wherein the speed of movement of said first and second modes are different.

23. The camera according to claim 22, wherein the speed of movement of the zoom lens in said second mode is greater than the speed of movement in said first mode.

24. The camera according to claim 22, wherein said driving means comprises a single zoom motor.

25. The camera according to claim 22, wherein said camera is a lens shutter type of camera.

26. The camera according to claim 22, wherein one of said first and second limit positions is a MACRO position.

27. A zoom lens driving apparatus adapted to be used in a camera having a zoom lens and a mode selection means, said apparatus including means for moving said zoom lens in an optical axis direction within a zooming range of said zoom lens, and means for selectively moving said zoom lens into and out of zooming range in accordance with a selection mode selected by said mode selection means, said apparatus further comprising means for differentiating the speed of movement of the zoom lens within said zoom range and outside of said zooming range.

28. A zoom lens driving apparatus in accordance with claim 27, in combination with said camera.

29. A zoom driving apparatus in accordance with claim 27, wherein said driving means comprises means for moving said zoom lens faster when it is out of said zooming range than when it is within said zooming range.

30. A zoom lens driving apparatus in accordance with claim 27, further comprising a common zoom motor for driving both of said first and second driving means.

31. A zoom lens driving apparatus in accordance with claim 27, wherein said zooming range is between a first limit position and a second limit position, said first limit position corresponding to the shortest focal length of the zoom lens, and said second limit position corresponding to the longest focal length of said zoom lens, said first limit position and said second limit position being outside of said zooming range.

32. A zoom lens driving apparatus in accordance with claim 31, wherein said means for selectively moving said zoom lens includes means for moving said zoom lens directly to either of said first limit position or said second limit position.

* * * * *